United States Patent
Oh et al.

(10) Patent No.: US 11,083,014 B2
(45) Date of Patent: Aug. 3, 2021

(54) METHOD AND APPARATUS FOR INDICATING CHANNEL OCCUPANCY TIME IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Hyunseok Ryu, Gyeonggi-do (KR); Sungjin Park, Gyeonggi-do (KR); Jonghyun Bang, Gyeonggi-do (KR); Jeongho Yeo, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/530,294

(22) Filed: Aug. 2, 2019

(65) Prior Publication Data

US 2020/0045738 A1    Feb. 6, 2020

(30) Foreign Application Priority Data

Aug. 3, 2018   (KR) .................. 10-2018-0090912

(51) Int. Cl.
*H04W 74/08*   (2009.01)
*H04W 16/14*   (2009.01)
(Continued)

(52) U.S. Cl.
CPC ....... *H04W 74/0808* (2013.01); *H04W 16/14* (2013.01); *H04W 72/042* (2013.01); *H04W 72/0446* (2013.01); *H04W 72/1263* (2013.01)

(58) Field of Classification Search
CPC ... H04W 16/14; H04W 72/04; H04W 72/042; H04W 72/0446; H04W 72/12;
(Continued)

(56) References Cited

U.S. PATENT DOCUMENTS

2017/0048718 A1   2/2017   Kim et al.
2018/0027582 A1   1/2018   Yerramalli et al.
(Continued)

FOREIGN PATENT DOCUMENTS

WO   WO 2017/135726           8/2017
WO   WO-2019192449 A1 * 10/2019 ............ H04W 74/08

OTHER PUBLICATIONS

Nokia, Nokia Shanghai Bell, "Frame Structure for NR-U Operation", R1-1806105, 3GPP TSG RAN WG1 Meeting #93, May 21-25, 2018, 6 pages.

(Continued)

*Primary Examiner* — Tri H Phan
(74) *Attorney, Agent, or Firm* — The Farrell Law Firm, P.C.

(57) ABSTRACT

A method, performed by a base station (BS), of indicating a channel occupancy time of an unlicensed band is provided and includes transmitting physical downlink control channel (PDCCH) configuration information to a user equipment (UE), performing a channel access procedure to occupy a channel of the unlicensed band, and transmitting slot format indicator information about at least one slot within a channel occupancy time occupied by performing the channel access procedure, based on the PDCCH configuration information, wherein the slot format indicator information is determined based on at least one of a maximum channel occupancy time of the BS or the channel occupancy time occupied by performing the channel access procedure.

16 Claims, 14 Drawing Sheets

(51) Int. Cl.
*H04W 72/04* (2009.01)
*H04W 72/12* (2009.01)

(58) Field of Classification Search
CPC ......... H04W 72/1263; H04W 72/1278; H04W 72/1289; H04W 74/00; H04W 74/02; H04W 74/08; H04W 74/0808; H04L 5/00; H04L 5/0053
See application file for complete search history.

(56) References Cited

U.S. PATENT DOCUMENTS

| | | | | |
|---|---|---|---|---|
| 2019/0313383 | A1* | 10/2019 | Xiong | H04W 16/14 |
| 2019/0335456 | A1* | 10/2019 | Yerramalli | H04W 74/006 |
| 2020/0021999 | A1* | 1/2020 | Park | H04W 72/042 |
| 2020/0045696 | A1* | 2/2020 | Huang | H04L 5/0094 |
| 2020/0229231 | A1* | 7/2020 | Oh | H04W 24/08 |
| 2020/0245357 | A1* | 7/2020 | Cui | H04W 72/042 |
| 2021/0007143 | A1* | 1/2021 | Zhou | |

OTHER PUBLICATIONS

Qualcomm Incorporated, "Summary on Remaining Issues on GC-PDCCH Carrying SFI", R1-1803270, 3GPP TSG RAN WG1 #92, Feb. 26-Mar. 2, 2018, 17 pages.
Sony, "NR Unlicensed Design Considerations", R1-1802066, 3GPP TSG RAN WG1 Meeting #92, Feb. 26-Mar. 2, 2018, 4 pages.
International Search Report dated Nov. 13, 2019 issued in counterpart application No. PCT/KR2019/009530, 10 pages.

* cited by examiner

METHOD AND APPARATUS FOR INDICATING CHANNEL OCCUPANCY TIME IN WIRELESS COMMUNICATION SYSTEM

CROSS-REFERENCE TO RELATED APPLICATION

This application is based on and claims priority under 35 U.S.C. § 119 to Korean Patent Application No. 10-2018-0090912, filed on Aug. 3, 2018, in the Korean Intellectual Property Office, the disclosure of which is incorporated by reference herein in its entirety.

BACKGROUND

1. Field

The present disclosure relates generally to a method and apparatus for transmitting and receiving data in a wireless communication system.

2. Description of Related Art

To meet increasing demand with respect to an increase in wireless data traffic after the commercialization of $4^{th}$ generation (4G) communication systems, efforts have been made to develop $5^{th}$ generation (5G) or pre-5G communication systems. For this reason, 5G or pre-5G communication systems are called "beyond 4G network" communication systems or "post long term evolution (post-LTE)" systems.

To achieve high data rates, implementation of 5G communication systems in an ultra-high frequency or millimeter-wave (mmWave) band (e.g., a 60 gigahertz (GHz) band) is being considered. To reduce path loss and increase a transmission distance in the ultra-high frequency band for 5G communication systems, various technologies, such as beamforming, massive multiple-input and multiple-output (massive MIMO), full-dimension MIMO (FD-MIMO), array antennas, analog beamforming, and large-scale antennas, are being studied.

To improve system networks for 5G communication systems, various technologies, such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation, have been developed. In addition, for 5G communication systems, advanced coding modulation (ACM) technologies, such as hybrid frequency-shift keying (FSK) quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of cloud radio access network (Cloud-RAN) as the above-described big data processing technology may be an example of convergence of 5G communication technology and IoT technology.

Because various services may be provided based on the aforementioned technical features and the development of wireless communication systems, methods for effectively providing these services are required.

SUMMARY

The present disclosure has been made to address the above-mentioned problems and disadvantages, and to provide at least the advantages described below.

According to an aspect of the present disclosure, a method, performed by a base station (BS), of indicating a channel occupancy time of an unlicensed band includes transmitting physical downlink control channel (PDCCH) configuration information to a user equipment (UE), performing a channel access procedure to occupy a channel of the unlicensed band, and transmitting slot format indicator information about at least one slot within a channel occupancy time occupied by performing the channel access procedure, based on the PDCCH configuration information, wherein the slot format indicator information is determined based on at least one of a maximum channel occupancy time of the BS or the channel occupancy time occupied by performing the channel access procedure.

According to another aspect of the present disclosure, a method, performed by a UE, of obtaining channel occupancy time information about an unlicensed band includes receiving, from a BS, a PDCCH, based on PDCCH configuration information, obtaining slot format indicator information in the received PDCCH, and determining at least one of a maximum channel occupancy time of the BS or a channel occupancy time, based on the slot format indicator information.

According to another aspect of the present disclosure, a base station for indicating a channel occupancy time of an unlicensed band includes a transceiver, and a processor coupled with the transceiver and configured to transmit PDCCH configuration information to a UE, perform a channel access procedure to occupy a channel of the unlicensed band, and transmit slot format indicator information about at least one slot within a channel occupancy time occupied by performing the channel access procedure, based on the PDCCH configuration information, wherein the slot format indicator information is determined based on at least one of a maximum channel occupancy time of the BS or the channel occupancy time occupied by performing the channel access procedure.

According to another aspect of the present disclosure, a UE for obtaining channel occupancy time information about an unlicensed band includes a transceiver, and a processor coupled with the transceiver and configured to receive, from a BS, a PDCCH based on PDCCH configuration information, obtain slot format indicator information in the received PDCCH, and determine at least one of a maximum channel occupancy time of the BS or a channel occupancy time, based on the slot format indicator information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
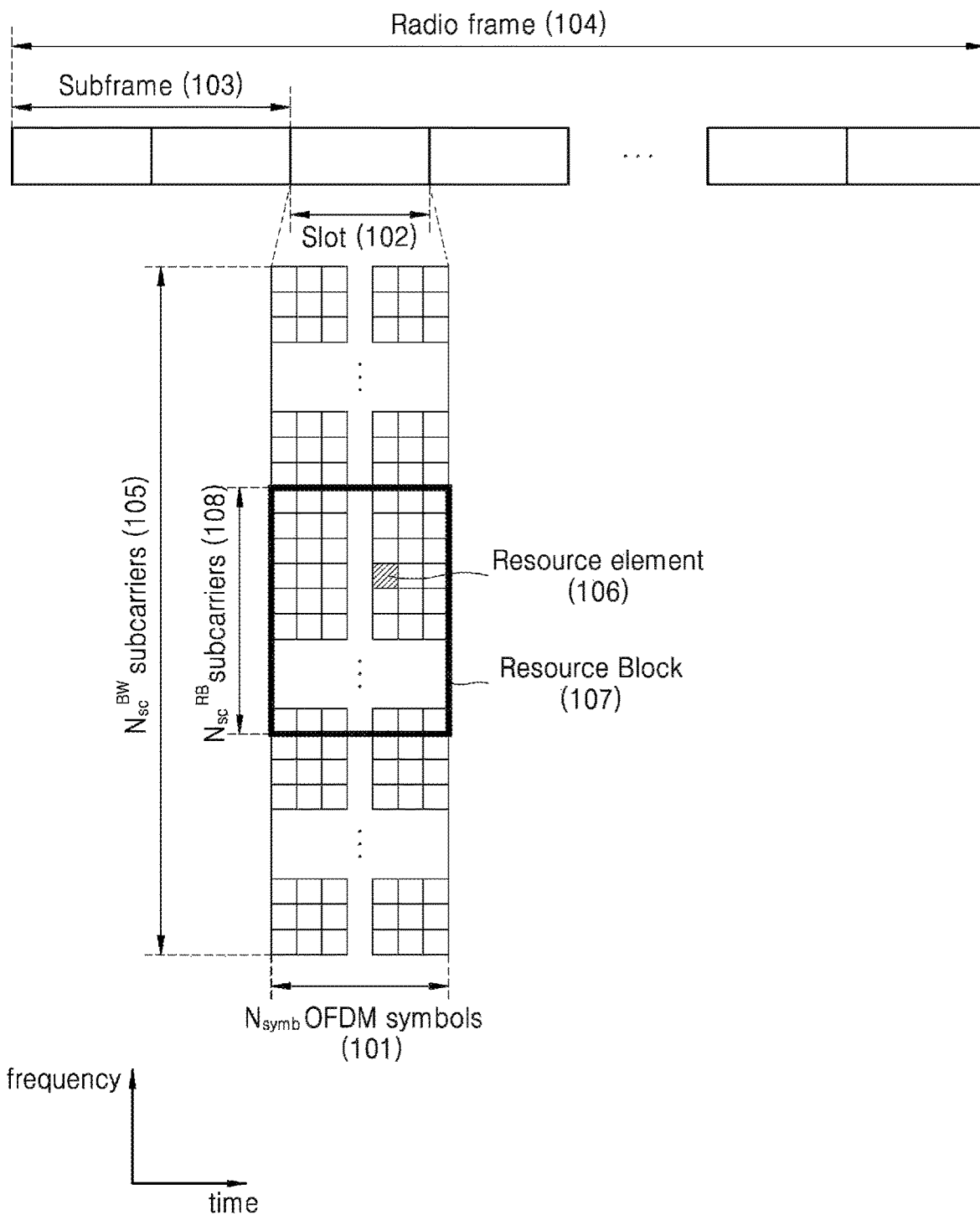
FIG. 1 is a diagram illustrating a structure of uplink/downlink (UL/DL) time-frequency domain transmission in a new radio (NR) system, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

As used herein, the expressions "A or B", "at least one of A and B", "at least one of A or B", "one or more of A and B", and "one or more of A or B" may include any and all combinations of one or more of the associated listed items. Terms such as "A or B", "at least one of A and B", or "at least one of A or B" may refer any and all of the cases where at least one A is included, where at least one B is included, or where both of at least one A and at least one B are included.

In the drawings, some elements may be exaggerated, omitted, or roughly illustrated. Also, the size of each element does not exactly correspond to an actual size of the element. In each drawing, elements that are the same or are in correspondence are rendered with the same reference numeral.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer, or the other programmable data processing apparatus, may provide operations for performing the functions described in one or more of the flowchart blocks.

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element, such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "unit" may be combined into the smaller number of elements and "unit", or may be divided into additional elements and "unit". Furthermore, the elements and "unit" may be embodied to reproduce one or more central processing units (CPUs) in a device or security multimedia card. Also, in an embodiment of the disclosure, the "unit" may include at least one processor. Throughout the specification, a layer may also be referred to as an entity.

The most common services of the 5G system may include an enhanced mobile broad band (eMBB) service, a ultra-reliable and low latency communication (URLLC) service, a massive machine type communication (mMTC) service, or an evolved multimedia broadcast/multicast service (eM-BMS). A system that provides the URLLC service may be called an URLLC system, and a system that provides the eMBB service may be called an eMBB system. In this regard, the terms "service" and "system" may be interchangeably used.

In such a communication system, a plurality of services may be provided to a user, and to provide the plurality of services to the user, a method and apparatus for providing each of the services in a same time interval according to features may be needed.

In a wireless communication system, e.g., an LTE system, an LTE-advanced (LTE-A) system or a 5G (or NR) system, a BS and a UE may be configured such that the BS transmits downlink control information (DCI) to the UE, the DCI including resource assignment information for transmission of a DL signal to be transmitted via a PDCCH. The UE receives at least one DL signal of the DCI (e.g., a channel-state information reference signal (CSI-RS)), a physical broadcast channel (PBCH), or a physical downlink shared channel (PDSCH).

For example, the BS transmits, in a subframe n, DCI indicating the UE to receive the PDSCH in the subframe n via the PDCCH, and upon reception of the DCI, the UE receives the PDSCH in the subframe n, based on the received DCI.

Also, in the LTE, LTE-A, or NR system, the BS and the UE may be configured such that the BS transmits DCI including UL resource assignment information to the UE via the PDCCH, and thus the UE transmits at least one UL signal of UCI (e.g., a sounding reference signal (SRS), UCI, or a physical random access channel (PRACH)) or a PUSCH to the BS.

For example, the UE may receive, from the BS via the PDCCH, UL transmission configuration information (or UL DCI or UL grant) in a subframe n, and may perform UL data channel transmission (hereinafter, PUSCH transmission), according to a pre-defined time (e.g., n+4), a time configured by an upper signal (e.g., n+k), or according to UL signal transmission time indicator information included in the UL transmission configuration information.

In a case where a configured DL transmission is transmitted from the BS to the UE via an unlicensed band, or a configured UL transmission is transmitted from the UE to the BS via the unlicensed band, a transmitting apparatus (the BS or the UE) may perform, before, or immediately before, a start of a configured signal transmission, a channel access procedure or listen-before talk (LBT) procedure on the unlicensed band where a signal transmission is configured. According to a result of performing the channel access procedure, when it is determined that the unlicensed band is in an idle state, the transmitting apparatus may access the unlicensed band and then perform the configured signal transmission.

According to the result of the channel access procedure performed by the transmitting apparatus, when it is determined that the unlicensed band is not in the idle state or is determined that the unlicensed band is in an occupied state, the transmitting apparatus is not able to access the unlicensed band and thus may not be able to perform the configured signal transmission. In general, in the channel access procedure with respect to the unlicensed band where signal transmission is configured, the transmitting apparatus may determine the idle state of the unlicensed band by receiving a signal in the unlicensed band during a predetermined time or a time calculated according to a pre-defined rule (e.g., a time calculated using a random value selected by the BS or the UE), and then a strength of the received signal may be compared with a threshold value that is pre-defined or calculated by using a function of at least one parameter including a channel bandwidth, a bandwidth of a signal to be transferred, intensity of transmit power, or a beamwidth of a transmission signal.

For example, when a strength of a signal received by the transmitting apparatus during 25 microseconds (µs) is less than −72 decibel-milliwatts (dBm), that is a pre-defined threshold, the transmitting apparatus may determine that the unlicensed band is in the idle state and thus may perform the configured signal transmission. In this regard, a maximum available time of the signal transmission may be limited according to a maximum channel occupancy time in the unlicensed band defined according to each country or each region, or a type (e.g., the BS, the UE, a master device or a slave device) of the transmitting apparatus. For example, in Japan, the BS or the UE in 5 GHz of the unlicensed band may perform the channel access procedure and then may transmit, during a maximum of 4 ms, a signal by occupying a channel without additionally performing the channel access procedure. When the strength of the signal received by the transmitting apparatus during 25 µs is greater than −72 dBm, which is the pre-defined threshold, the BS may determine that the unlicensed band is not in the idle state and may not transmit a signal.

For the 5G communication system, various technologies may be introduced for providing various services and supporting a high data transmission rate, the various technologies including re-transmission in a code block group unit, or transmission of a UL signal without UL scheduling information. Therefore, to perform 5G communication via the unlicensed band, a more efficient channel access procedure based on various parameters is required.

Wireless communication systems have been developed providing voice centered services and broadband wireless communication systems have been developed providing high-speed, high-quality packet data services, like communication standards of high speed packet access (HSPA), LTE or evolved universal terrestrial radio access (E-UTRA), LTE-A, and LTE-Pro of the 3GPP, high rate packet data (HRPD) ultra mobile broadband (UMB) of 3GPP2, or 802.16e of the Institute of Electrical and Electronic Engineers (IEEE). 5G or NR communication standards are being established for a 5G wireless communication system.

In a wireless communication system including 5G, at least one of services including eMBB, mMTC, and URLLC may be provided to the UE. The services may be provided to a same UE during a same time interval. According to an embodiment of the present disclosure, the eMBB service may be for high-speed transmission of high-volume data, the mMTC service may be for minimization of power of the terminal and enabling access by multiple terminals, and the URLLC service may be for high reliability and low latency. The three services may be primary services in an LTE system or a post-LTE system, such as 5G or NR/next radio system.

When BS data corresponding to the eMBB service is scheduled to a certain UE in a transmission time interval (TTI), and then a situation to transmit URLLC data in the TTI occurs, a part of the eMBB data may not be transmitted in a frequency band where the scheduled eMBB data is being transmitted, and the URLLC data may be transmitted in the frequency band. A UE to which eMBB has been scheduled and a UE to which URLLC has been scheduled may be a same UE or different UEs. In the aforementioned example, the part of the eMBB data that has already been scheduled and is being transmitted is not transmitted, and thus a probability that the eMBB data is lost may increase. Therefore, it may be beneficial to define, for the UE to which eMBB has been scheduled or the UE to which URLLC has been scheduled, a method of processing a received signal and a method of receiving a signal.

A BS is an entity that assigns resources of a terminal, and may be at least one of an evolved node B (eNode B or eNB), a Node B, a BS, a wireless access unit, a BS controller, or a node on a network. Examples of a terminal may include a UE, a mobile station (MS), a cellular phone, a smartphone, a computer, or a multimedia system capable of performing a communication function. A DL may refer to a transmission path of a wireless signal from a BS to a UE, and a UL may refer to a transmission path of a wireless signal from a UE to a BS. Although the following descriptions may be provided for LTE or LTE-A systems, embodiments of the disclosure are also applicable to other communication systems having similar technical backgrounds or channel structure. For example, embodiments of the disclosure are also applicable to 5G (or NR) communication systems developed after LTE-A systems. Additionally, embodiments of the disclosure are also applicable to other communication systems through modification at the discretion of one of ordinary skill in the art without greatly departing from the scope of the disclosure.

As a representative example of the broadband wireless communication system, the NR system has adopted an orthogonal frequency division multiplexing (OFDM) scheme in a DL and has adopted both the OFDM scheme and a single carrier frequency division multiple access (SC-FDMA) scheme in a UL. The UL refers to a radio link through which a UE (also referred to as a terminal) or an MS transmits data or a control signal to a BS (e.g., eNB), and the DL refers to a radio link through which a BS transmits data or a control signal to a terminal. The multiple access scheme may distinguish between data and control information for each user by assigning and operating time-frequency resources on which the data or the control information is to be carried for each user, so that the time-frequency resources do not overlap each other, that is, so that orthogonality is established.

The NR system employs a hybrid automatic repeat request (HARQ) scheme that retransmits data in a physical layer when decryption fails in initial transmission of the data. The HARQ scheme indicates that, when a receiver fails to accurately decrypt (decode) data, the receiver transmits information indicating a decoding failure, i.e., a negative acknowledgement (NACK), to a transmitter so as to allow the transmitter to retransmit the data in the physical layer. The receiver improves data reception performance by combining the data retransmitted by the transmitter with data that previously failed to be decoded. When the receiver accurately decoded the data, the receiver may transmit information indicating a decoding success, i.e., an acknowledgement (ACK), to the transmitter so as to allow the transmitter to transmit new data.

The disclosure provides a method and apparatus for indicating a channel occupancy time. Descriptions are provided for a method of transmitting and receiving information about a channel occupancy time and a slot format indicator in the channel occupancy time, the method being performed by a node to receive a DL signal or a system and node to transmit a UL signal via an unlicensed band in a wireless communication system. The disclosure provides a method of transmitting information about a channel occupancy time of a transmitting apparatus and a slot format indicator indicating a slot configuration in the channel occupancy time, the method being performed by a node to receive a DL signal or a system and node to transmit a UL signal via an unlicensed band in a wireless communication system, and provides a method of determining the channel occupancy time and the slot configuration, the method being performed by a node that receives the information and the slot format indicator.

FIG. 1 is a diagram illustrating a basic structure of a time-frequency domain that is a wireless resource region where data or a control channel is transmitted from a UL or a DL of an NR system or a system similar to the NR system, according to an embodiment.

Referring to FIG. 1, a horizontal axis represents a time domain and a vertical axis represents a frequency domain in the wireless resource region. A minimum transmission unit in the time domain may be an OFDM symbol or a discrete Fourier transform-spread-OFDM (DFT-s-OFDM) symbol, and $N_{symb}$ OFDM symbols or $N_{symb}$ DFT-s-OFDM symbols 101 may be gathered to constitute one slot 102.

The OFDM symbol may be used to transmit and receive a signal according to an OFDM multiplexing scheme, and the DFT-s-OFDM symbol may be used to transmit and receive a signal according to a DFT-s-OFDM multiplexing scheme or a single carrier frequency division multiple access (SC-FDMA) multiplexing scheme. Hereinafter, for convenience of description, the OFDM symbol and the DFT-s-OFDM symbol are not distinguished therebetween and thus are collectively referred to as an OFDM symbol, and will now be described with reference to reception and transmission of a DL signal, but may also be applied to reception and transmission of a UL signal.

When spacing between subcarriers is 15 kHz, one slot 102 may constitute one subframe 103, and lengths of the slot 102 and the subframe 103 may each be 1 ms. The number of the slots 102 constituting one subframe 103, and a length of the slot 102 may vary according to spacing between subcarriers. For example, when spacing between subcarriers is 30 kHz, two slots 102 may be gathered to constitute one subframe 103. In this case, a length of the slot 102 is 0.5 ms, and a length of the subframe 103 is 1 ms. A radio frame 104 may be a time domain period composed of 10 subframes. A minimum transmission unit in the frequency domain is a subcarrier, and a bandwidth of a whole system transmission band is composed of $N_{sc}^{BW}$ subcarriers 105.

However, numerical values, such as spacing between subcarriers, the number of the slots 102 included in the subframe 103, a length of the slot 102, or a length of the subframe 103, may be variably applied. For example, in an LTE system, spacing between subcarriers is 15 kHz, two slots 102 are gathered to constitute one subframe 103, and in this case, a length of the slot 102 is 0.5 ms and a length of the subframe 103 is 1 ms.

A basic unit of a resource in the time-frequency domain is a resource element (RE) 106 and may be expressed as a symbol index and a subcarrier index. A resource block (RB) or a physical resource block (PRB) 107 may be defined as $N_{symb}$ consecutive OFDM symbols 101 in the time domain and $N_{SC}^{RB}$ consecutive subcarriers 108 in the frequency domain. Therefore, one RB 107 in one slot may include REs=$N_{symb} \times N_{SC}^{RB}$. In general, a minimum data assignment unit of frequency domain is the RB 107. In the NR system, $N_{symb}$ may be 14 and $N_{SC}^{RB}$ may be 12, and the number of RBs ($N_{RB}$) may be changed based on a bandwidth of a system transmission band. In the LTE system, $N_{symb}$ may be 7 and $N_{SC}^{RB}$ may be 12, and $N_{RB}$ may be changed based on a bandwidth of a system transmission band.

DCI may be transmitted within first N OFDM symbols in a subframe. N may be {1, 2, 3}, and a UE may be configured by a BS with respect to the number of symbols for which DCI is transmittable via an upper signal. In addition, based on the amount of control information to be transmitted in a current slot, the BS may change, for each slot, the number of symbols on which DCI is transmittable from a slot, and may transmit information about the number of symbols to the UE via a separate DL control channel.

In the NR or LTE system, scheduling information about DL data or UL data in DCI may be transmitted from the BS to the UE. The DCI may be defined in various formats, and may indicate, according to each format, whether the scheduling information is UL data scheduling information (UL grant) or DL data scheduling information (DL grant), whether the DCI is a compact DCI having a small size of control information, whether the control information is fall-back DCI, whether spatial multiplexing using multiple antennas is applied, or whether the DCI is a DCI for controlling power. For example, DCI format (e.g., DCI format 1_0 of NR) that is the scheduling control information (DL grant) of the DL data may include at least one of a plurality of pieces of control information below:

DCI format identifier: An identifier that identifies a format of received DCI.

Frequency domain resource assignment: This indicates an RB assigned to data transmission.

Time domain resource assignment: This indicates a slot and a symbol that are assigned to data transmission.

Virtual resource block (VRB)-to-PRB mapping: This indicates whether to use a VRB mapping scheme.

Modulation and coding scheme (MCS): This indicates a modulation scheme used for data transmission and a size of a transport block (TB) that is data to be transmitted.

New data indicator: This indicates whether HARQ transmission is an initial transmission or retransmission.

Redundancy version: This indicates a redundancy version of HARQ.

HARQ process number: This indicates a process number of HARQ.

PDSCH assignment information (DL assignment index): This is indicated to the UE with respect to the number of PDSCH receptions results to be reported to the BS.

Transmit power control (TPC) command for physical uplink control channel (PUCCH): This indicates a transmission power control command for a PUCCH that is a UL control channel.

PUCCH resource indicator: This indicates a PUCCH resource to be used in a HARQ-ACK report including a result of receiving a PDSCH set via corresponding DCI.

PUCCH transmission timing indicator (PDSCH-to-HARQ_feedback timing indicator): This indicates information about a slot or symbol on which a PUCCH is to be transmitted, wherein the PUCCH is for a HARQ-ACK report including a result of receiving a PDSCH set via corresponding DCI.

The DCI may be transmitted via a PDCCH (or control information, hereinafter, interchangeably used) that is a DL physical control channel or an enhanced PDCCH (EPDCCH) (or enhanced control information, hereinafter, interchangeably used) after passing through a channel coding and modulation process.

In general, the DCI is scrambled independently by a specific radio network temporary identifier (RNTI) or terminal identifier (C-RNTI) with respect to each terminal. The DCI is added with a cyclic redundancy check (CRC), is channel-coded, and then is configured as an independent PDCCH to be transmitted. In the time domain, the PDCCH is mapped and transmitted for the control channel transmission period. A mapping location of the PDCCH in the frequency domain may be determined by an identifier (ID) of each terminal, and the PDCCH may be transmitted through a transmission bandwidth of a whole system.

The DL data may be transmitted through a PDSCH that is a physical channel for transmitting the DL data. The PDSCH may be transmitted after the control channel transmission period, and scheduling information, such as a specific mapping location or a modulation scheme in the frequency domain, may be determined based on the DCI to be transmitted via the PDCCH.

The BS notifies the UE of a modulation scheme applied to the PDSCH to be transmitted and a transport block size (TBS) to be transmitted, by using an MCS included in the control information constituting the DCI. The MCS may be composed of 5 bits or may be composed of more or less bits than 5 bits. The TBS corresponds to a size of the BS before channel coding for error correction is applied to the TB to be transmitted by the BS.

The modulation scheme supported in the NR system is quadrature phase shift keying (QPSK), 16 quadrature amplitude modulation (16QAM), 64QAM, or 256QAM, and respective modulation orders (Qm) correspond to 2, 4, and 6. That is, in a case of the QPSK modulation, 2 bits per symbol may be transmitted, in a case of the 160QAM modulation, 4 bits per symbol may be transmitted, in a case of the 64QAM modulation, 6 bits per symbol may be transmitted, and in a case of the 256QAM modulation, 8 bits per symbol may be transmitted. Also, a modulation scheme of 256QAM or more may be used according to system modification.

In the NR system, UL/DL HARQ adapts an asynchronous HARQ scheme in which a data re-transmission time is not fixed. Describing an example of a DL, when the HARQ NACK is fed back from the UE with respect to the initially-transmitted data transmitted by the BS, the BS may freely determine transmission time of retransmission data through the scheduling operation. The UE buffers data that is determined as an error as a result of decoding the received data for the HARQ operation, and then performs combining with the next retransmission data. HARQ ACK/NACK information of the PDSCH transmitted in a subframe n-k may be transmitted from the UE to the BS via the PUCCH or the PUSCH in a subframe n.

In the 5G communication system such as the NR system, a k value may be included in DCI for indicating or scheduling reception of the PDSCH transmitted in the subframe n-k and then transmitted, or may be configured in the UE based on an upper signal. In this regard, the BS may configure one or more k values as the upper signal, and may indicate a specific k value by using the DCI. Accordingly, k may be determined based on HARQ-ACK processing capacity of the UE, i.e., a minimum time required for the UE to receive the PDSCH and then to generate and report HARQ-ACK with respect to the PDSCH. Also, before the k value is configured in the UE, the UE may use a pre-defined value or a default value.

The descriptions about the wireless communication system and the method and apparatus provided by an embodiment of the disclosure are provided with respect to the NR system, but the disclosure is not limited to the NR system and thus may be applied to various wireless communication systems including LTE, LTE-A, LTE-A-Pro, and 5G systems. Also, the descriptions of the disclosure are provided with reference to a system and apparatus that transmit and receive a signal by using the unlicensed band, but the descriptions of the disclosure may also be applicable to a system that operates in a licensed band.

Hereinafter, in the disclosure, upper signaling or an upper signal may be a signal transmitting method by which the BS transmits a signal to the UE by using a DL data channel of a physical layer, or the UE transmits a signal to the BS by using a UL data channel of a physical layer, and may indicate a method by which a signal is transmitted by upper signaling (or the upper signal) including radio access control (RRC) signaling or PDCP signaling, or a medium access control element (MAC CE)). Also, the upper signaling or the upper signal may include system information, e.g., system information block (SIB), which is commonly transmitted to a plurality of UEs.

In a system that performs communication in an unlicensed band, a transmitting apparatus (the BS or the UE) to transmit a signal via the unlicensed band may perform, before signal transmission, a channel access procedure or LBT on the unlicensed band that is a communication target, and when it is determined that the unlicensed band is in an idle state according to a result of the channel access procedure, the transmitting apparatus may access the unlicensed band and may perform the signal transmission. According to the result of the channel access procedure, when it is determined that the unlicensed band is not in the idle state, the transmitting apparatus may not be able to perform the signal transmission.

In the channel access procedure with respect to the unlicensed band, the transmitting apparatus may determine the idle state of the unlicensed band by receiving a signal in the unlicensed band during a fixed time or a time calculated according to a pre-defined rule (e.g., a time calculated using a random value selected by the BS or the UE), and then by comparing a strength of the received signal with a threshold value that is pre-defined or calculated by using a function of at least one parameter including a channel bandwidth, a bandwidth of a signal to be transferred, intensity of transmit power, or a beamwidth of a transmission signal.

For example, the transmitting apparatus may measure a strength of a signal for X μs (e.g., for 25 μs) immediately before a time to transmit the signal, and when the measured strength of the signal is less than a pre-defined or calculated threshold T (e.g., −72 dBm), the transmitting apparatus may determine that the unlicensed band is in the idle state and thus may transmit a configured signal. In this regard, a maximum available time of consecutive signal transmissions after the channel access procedure may be limited according to a maximum channel occupancy time in the unlicensed band defined according to each country, each region, or each frequency band, or may be limited according to a type (e.g., the BS or the UE, or a master device or a slave device) of the transmitting apparatus. For example, in Japan, the BS or the UE in 5 GHz of an unlicensed band may transmit, during maximum 4 ms, a signal by occupying a channel without additionally performing the channel access procedure on the unlicensed band that has been determined to be in the idle state according to a result of the channel access procedure.

In detail, when the BS or the UE attempts to transmit a DL signal or a UL signal via an unlicensed band, a channel access procedure that may be performed by the BS or the UE may be divided to the types below.

Type 1: To perform the channel access procedure for a variable time and then transmit UL/DL signals.

Type 2: To perform the channel access procedure for a fixed time and then transmit UL/DL signals.

Type 3: To transmit a UL signal or a DL signal without performing the channel access procedure.

A case in which the BS transmits a DL signal to the UE via the unlicensed band, and a case in which the UE transmits an UL signal to the BS via the unlicensed band are both described, but embodiments of the disclosure may be equally applied or may be modified and then applied according to a case in which the UE transmits a UL signal to the BS via the unlicensed band and a case in which the BS transmits a DL signal to the UE via the unlicensed band. Therefore, detailed descriptions about transmission and reception of a DL signal are not provided. Also, it is assumed that one DL data information (a codeword or a TB) or UL data information is exchanged between the BS and the UE. However, embodiments of the disclosure are also applicable to a case in which the BS transmits a DL signal to a plurality of UEs or a case in which a plurality of codewords or TBs are exchanged between the BS and the UE.

A transmitting node (hereinafter, the BS or the UE) attempting to perform signal transmission via the unlicensed band may determine a channel access procedure scheme according to a type of a signal to be transmitted. For example, when the BS attempts to transmit a DL signal including a DL data channel via the unlicensed band, the BS may perform a Type-1 or Type-3 channel access procedure. When the BS attempts to transmit a DL signal not including a DL data channel via the unlicensed band, for example, when the BS attempts to transmit a synchronizing signal or a DL control channel, the BS may perform a Type-2 channel access procedure, and may transmit the DL signal.

In this regard, the channel access procedure scheme may be determined according to a transmission length of the signal to be transmitted via the unlicensed band, or a duration of a time or period in which the unlicensed band is occupied and used. In general, the Type-1 or Type-3 scheme may require a channel access procedure to be performed longer than a channel access procedure based on the Type-2 scheme. Therefore, when transmitting a signal during a short time period or a time period equal to or less than a reference time (e.g., X ms or Y symbol), the Type-2 channel access procedure may be performed. However, when transmitting a signal during a long time period or a time period equal to or greater than the reference time (e.g., X ms or Y symbol), the Type-1 or Type-3 channel access procedure may be performed. In other words, channel access procedures according to different types may be performed in an available time of the unlicensed band.

When performing the Type-1 or Type-3 channel access procedure based on the aforementioned references, the transmitting node may determine a channel access priority class based on a quality of service class identifier (QCI) of the signal to be transmitted via the unlicensed band, and may perform the channel access procedure by using at least one value from among pre-defined configuration values, as provided in Table 1, based on the determined channel access priority class.

For example, QCIs 1, 2, and 4 indicate QCI values of respective services such as conversational voice, conversational video (live streaming), and non-conversational video (buffered streaming). When transmitting a signal via the unlicensed band, the signal being with respect to a service that does not match a QCI of Table 1, the transmitting node may select the service, and a QCI of Table 1 which is the most relevant to the service and may select a channel access priority class of the selected QCI.

Table 1 shows a mapping relation between channel access priority classes and QCIs.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

According to a delayed time period (defer duration), a group of values or sizes of a contention window (CW_p), a minimum value and a maximum value of the contention window (CW_min,p and CW_max,p), or an available maximum channel occupancy time (T_mcot,p), based on the channel access priority class (p), may be determined according to Table 2, below.

In other words, when the BS attempts to transmit a DL signal via the unlicensed band, the BS performs the channel access procedure on the unlicensed band during a time equal to T_f+m_p*T_sl. When performing the channel access procedure when p=3 as the channel access priority class, a value of deferred duration which is required to perform the channel access procedure is set according to a formula that is T_f+m_p*T_sl (where mp=3). In this regard, T_f is a value fixed as 16 us, and a time of T_sl has to be an idle state. In a time after the time of T_sl from among a time of T_f (i.e., the time of T_f−T_sl), the BS may not perform the channel access procedure. Even when the BS performed a channel access procedure in the time of T_f−T_sl, a result of the channel access procedure is not used. In other words, the time of T_f−T_sl refers to a time in which the BS defers the performing of the channel access procedure.

When it is determined that the unlicensed band is in a constant idle state in a time of m_p*T_sl, it is possible that N=N−1. In this regard, N is selected to be a random integer value between 0 to a CW_p value at a point of time when the channel access procedure is performed. In a case of the channel access priority class being 3, a minimum contention window value and a maximum contention window value are 15 and 63, respectively. When it is determined that the unlicensed band is in the idle state in defer duration and a period of an additional channel access procedure, the BS may transmit a signal during T_mcot,p time (i.e., 8 ms). Table 2 shows channel access priority classes in a DL. For convenience of description, the disclosure will be described by using DL channel access priority classes, but for a UL, the channel access priority classes of Table 2 may be re-used or channel access priority classes may be separately defined for the UL and may be used.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial CW_p value is a minimum contention window value (CW_min,p). The BS that selected a value of N may perform the channel access procedure in a time of T_sl, and when the BS determines that the unlicensed band is in the idle state through the channel access procedure performed in the time of T_sl, the BS may change the value to N=N−1, and when N=0, the BS may transmit a signal during a maximum time of T_mcot,p via the unlicensed band. When the unlicensed band determined through the channel access procedure in the time of T_sl is not in the idle state, the value of N may not be changed and the channel access procedure may be performed again.

The CW_p value may be changed at a point of time when the BS initiates the channel access procedure, at a point of time when the BS selects the value of N to perform the channel access procedure, or based on a reception result with respect to a DL data channel in a reference subframe or a reference slot in a transmission period (or a maximum channel occupancy time (MCOT)) in which the BS most recently transmits a DL via the unlicensed band, immediately before the point of time when the BS initiates the channel access procedure or the point of time when the BS selects the value of N to perform the channel access procedure. In other words, the BS receives, from the UE, a report of the reception result with respect to DL data transmitted in the reference subframe or the reference slot, and may increase or minimally decrease the CW_p, based on a ratio (Z) of NACK in the received report of the reception result.

Figure 2:
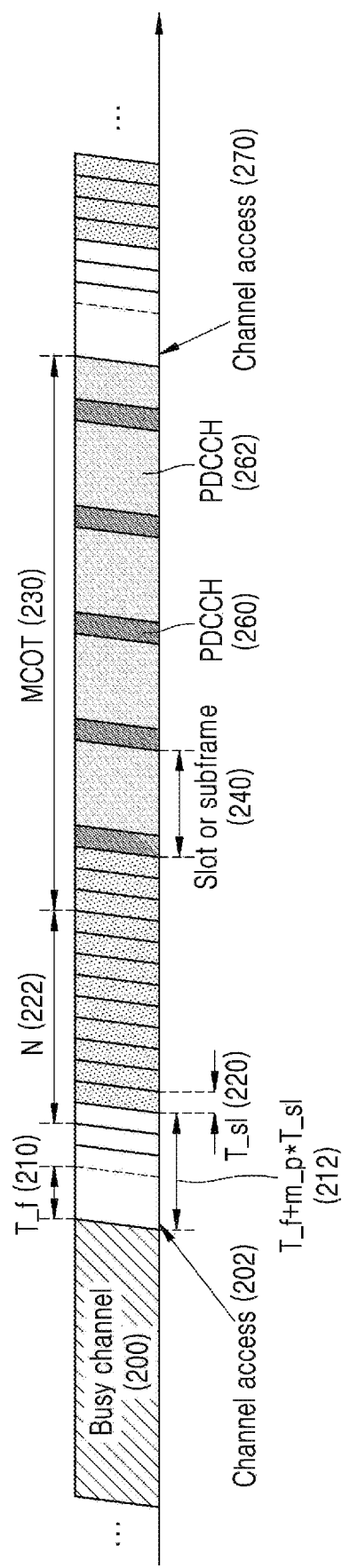
FIG. 2 illustrates a channel access procedure in an unlicensed band, according to an embodiment.

FIG. 2 illustrates a channel access procedure in an unlicensed band, according to an embodiment.

Referring to FIG. 2, a point of time when the BS initiates the channel access procedure 270, a point of time when the BS selects the value of N to perform the channel access procedure, or a first transmission period 240 (hereinafter, a slot or a subframe) of a transmission period 230 in which a DL signal has been most recently transmitted via the unlicensed band, immediately before the point of time when the BS initiates the channel access procedure 270 or the point of time when the BS selects the value of N to perform the channel access procedure, becomes a contention window change reference slot for the channel access procedure 270.

When the BS cannot receive a report of a reception result with respect to a DL data channel transmitted in the first slot 240 of the transmission period 230, for example, when a time interval between a first subframe and a point of time when the BS initiates the channel access procedure 270 is equal to or less than n slots or a subframe (i.e., when the BS initiates the channel access procedure before a time when the UE can report the reception result with respect to the DL data channel transmitted in the first slot 240), a first subframe of a transmission period in which a DL signal was most recently transmitted before the DL signal transmission period 230 becomes a reference subframe.

In other words, the point of time when the BS initiates the channel access procedure 270, the point of time when the BS selects the value of N to perform the channel access procedure, or in a case where the BS does not receive, from the UE, the reception result with respect to the DL data transmitted immediately before in the reference subframe 240, the BS may determine, as the reference frame, a first subframe of a transmission period of a most-recently transmitted DL signal from among reception results about a DL data channel which were previously received from UEs. Then, the BS may determine a CW_p value used in the channel access procedure 270, by using DL data reception results, which are received from the UEs, with respect to DL data transmitted via the DL data channel in the reference subframe.

For example, when the BS that transmitted a DL signal after a channel access procedure (e.g., CW_p=15), configured according to the channel access priority class being 3 (p=3), determines that 80% of the reception results being received from the UE with respect to DL data transmitted from the BS to the UE via the DL data channel in the first subframe are NACK, from among DL signals transmitted via the unlicensed band, the BS may increase the CW_p value from an initial value (CW_p=15) to a next CW_p value (CW_p=31).

In this regard, when the BS determines that at least 80% of the reception results are not NACK, the BS may maintain the CW_p value as a current value or may change the CW_p value to the initial CW_p value. In this regard, a change in the CW_p may be commonly applied to all of the channel access priority classes or may be applied to only a channel access priority class that was used in the channel access procedure. In this regard, a method of determining a Z value is provided. That is, a method, performed by the BS, of determining a reception result that is efficient in determining the CW_p value in the reference subframe or the reference slot for determining whether to change the CW_p value is provided. The reception result being from among reception results that are about DL data that was transmitted via a DL data channel and are transmitted or reported to the BS, by the UE.

When the BS transmits one or more codewords or TBs to one or more UEs in the reference subframe or the reference slot, the BS may determine the Z value as a ratio of NACK in reception results transmitted or reported by the one or more UEs about TBs received in the reference subframe or the reference slot. For example, when two codewords or two TBs are transmitted to a UE in the reference subframe or the reference slot, the BS may receive a transmission or two reports of DL data signal reception results about the two TBs from the UE. When a ratio of NACK (Z) in the two reception results is equal to or greater than a threshold value (e.g., Z=80%) that is pre-defined or set between the BS and the UE, the BS may change or increase the contention window value.

In this regard, when the UE performs bundling on DL data reception results about one or more subframes (e.g., M subframes) including the reference subframe or the reference slot, and transmits or reports a result thereof to the BS, the BS may determine that the UE has transmitted M reception results. Then, the BS may determine, as the Z value, a ratio of NACK in the M reception results, and may change, maintain, or initialize the CW_p value.

When the reference subframe is a reception result about a second slot from among two slots constituting one subframe, the BS may determine, as the Z value, a ratio of NACK in a reception result, which the UE transmitted or reported to the BS, about DL data received in the reference subframe (in other words, the second slot) and a next subframe.

Also, in a case where scheduling information or DL control information about a DL data channel to be transmitted by the BS is transmitted in a cell or a frequency band which is equal to a cell or a frequency band in which the DL data channel is transmitted, or a case where the scheduling information or the DL control information about the DL data channel to be transmitted by the BS is transmitted in the unlicensed band but and is transmitted in a cell or a frequency band which is different from a cell or a frequency band in which the DL data channel is transmitted, the BS may determine the reception result from the UE to be NACK and thus may determine the Z value. In addition, when the BS determines that the UE did not transmit a reception result about DL data that the UE received in a the reference subframe or the reference slot, and when the BS determines that the reception result about the DL data, which is transmitted by the UE, is at least one of DTX, NACK/DTX, or any state, the BS may determine the reception result from the UE to be NACK and thus may determine the Z value.

Alternatively, in a case where the scheduling information or the DL control information about the DL data channel to be transmitted by the BS is transmitted in a licensed band, when the BS determines that a reception result about DL data, which is transmitted by the UE, is at least one of DTX, NACK/DTX, or any state, the BS may not include the reception result from the UE in the Z value that is a reference of the CW_p value. In other words, the BS may determine the Z value while ignoring the reception result from the UE.

Also, in a case where the scheduling information or the DL control information about the DL data channel is to be transmitted in the licensed band, when the BS actually does not transmit DL data (no transmission), the BS may ignore a DL data reception result that the UE transmitted or reported from among DL data reception results about the reference subframe or the reference slot, which the UE transmitted or reported to the BS, and may determine the Z value.

In a 5G system, flexibly defining and operating a frame structure may be required based on various services and requirements. For example, services may have different subcarrier spacings, according to the requirements. In a current 5G communication system, to support a plurality of subcarrier spacings, the support may be determined by using Equation (1), below.

$$\Delta f = f_0 2^m \qquad (1)$$

$f_0$ indicates default subcarrier spacing of a system, and m indicates a scaling factor that is an integer. For example, when $f_0$ is 15 kilohertz (kHz), a set of subcarrier intervals that the 5G communication system may have may be composed of 3.75 kHz, 7.5 kHz, 15 kHz, 30 kHz, 60 kHz, 120 kHz, 240 kHz, or 480 kHz. An available set of subcarrier spacings may vary according to frequency bands. For example, in a frequency band equal to or less than 6 GHz, 3.75 kHz, 7.5 kHz, 15 kHz, 30 kHz, and 60 kHz may be used, and a frequency band equal to or greater than 6 GHz, 60 kHz, 120 kHz, and 240 kHz may be used.

A length of the OFDM symbol may vary according to spacing between subcarriers constituting an OFDM symbol. This is because, due to a characteristic of the OFDM symbol, the spacing between subcarriers and the length of the OFDM symbol have an inverse relationship. For example, when the spacing between subcarriers is increased by two (doubled), the length of the OFDM symbol is decreased by a half, and inversely, when the spacing between subcarriers is decreased by a half, the length of the OFDM symbol is increased by two (doubled).

Next, a resource region where a data channel is transmitted in the 5G communication system will be described.

Figure 3:
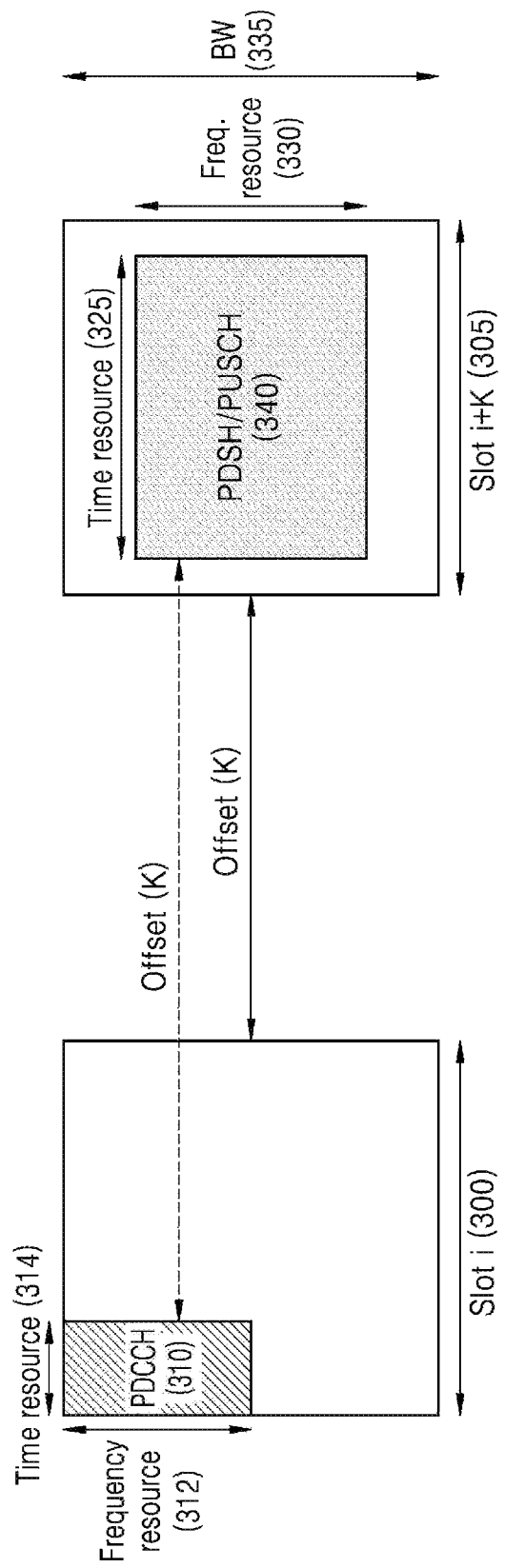
FIG. 3 illustrates a DL or UL scheduling method and a resource region in the NR system, according to an embodiment.

FIG. 3 illustrates a resource region where a data channel is transmitted in a 5G communication system, according to an embodiment.

Referring to FIG. 3, the UE monitors or searches for a PDCCH 310 in a DL control channel region (hereinafter, a control resource set (CORESET) to a search space (SS)) set according to an upper signal by the BS. In this regard, the DL control channel region is composed of time domain information 314 and frequency domain information 312, and the time domain information 314 may be configured according to a symbol unit, and the frequency domain information 312 may be configured according to an RB or an RB group.

When the UE detects the PDCCH 310 in a slot i 300, the UE obtains DCI transmitted via the detected PDCCH 310. The UE may obtain, based on the received DCI, scheduling information about a DL data channel or a UL data channel. In other words, the DCI may include information about a resource region (or a PDSCH transmission region) in which the UE is required to receive a DL data channel transmitted from the BS (hereinafter, a PDSCH), or information about a resource region that is assigned to the UE, by the BS, for transmission of a UL data channel (that is a PUSCH).

A case in which scheduling about transmission of a UL data channel (that is a PUSCH) is performed on the UE will now be described.

The UE that received DCI may determine, based on the DCI, a slot index or offset information K with respect to reception of the PUSCH, and may determine a PUSCH transmission slot index. For example, the UE may determine that the UE is scheduled to transmit the PUSCH in a slot i+K 305, based on the offset information K, according to the slot index i 300 where the PDCCH 310 is received. In this regard, the UE may also determine the slot i+K 305 or a symbol or time to initiate the PUSCH in the slot i+K 305, based on the offset information K, according to the received CORESET where the PDCCH 310 is received.

Also, the UE may obtain, from the DCI, PUSCH transmission time-frequency resource region information 325 and 330 in a PUSCH transmission slot 305. The PUSCH transmission frequency resource region information 330 may include information about a PRB unit or a PRB group unit. The PUSCH transmission frequency resource region information 330 may be about a region included in an initial bandwidth (BW) or an initial BW part (BWP) that is determined by or is configured to the UE via an initial access procedure. When a BW or a BWP is configured to the UE by using an upper signal, the PUSCH transmission frequency resource region information 330 may be a region included in the BW or the BWP that is configured by using the upper signal.

The PUSCH transmission time resource region information 325 may be information about a symbol unit or a symbol group unit or may be information indicating absolute time information. The PUSCH transmission time resource region information 325 may be expressed as a PUSCH transmission start time, lengths of symbol and PUSCH, a PUSCH transmission end time, or a combination of symbols, and may be included as one field or one value in DCI. In this regard, the PUSCH transmission time resource region information 325 may be included, in the DCI, as fields or values respectively expressing the PUSCH transmission start time, the lengths of symbol and PUSCH, the PUSCH transmission end time, or each of the symbols. The UE may transmit the PUSCH in a PUSCH transmission resource region 340 determined based on the DCI.

In the 5G communication system, to dynamically change a DL signal transmission period and an UL signal transmission period in a time division duplexing (TDD) system, the BS may indicate an SFI indicating whether each of OFDM symbols constituting one slot is a DL symbol, a UL symbol, or a flexible symbol. In this regard, a symbol indicated as the flexible symbol may be neither the DL symbol or the UL symbol, or may be a symbol that is changeable to the DL symbol or the UL symbol according to UE-specified control information or scheduling information. In this regard, the flexible symbol may include a gap guard that is required in a change from a DL to a UL.

The SFI is simultaneously transmitted to a plurality of UEs via a UE (cell) group common control channel. In other words, the SFI is transmitted via a PDCCH that is CRC scrambled by an identifier (e.g., an SFI-RNTI) different from a C-RNTI.

The SFI may include information about N slots, and a value of N may be configured, by the BS, to the UE by using the upper signal, from among a set of values that are integers or natural numbers greater than 0, or pre-defined available values such as 1, 2, 5, 10, or 20. Also, a size of the SFI may be configured, by the BS, to the UE by using the upper signal. Examples of slot formats that may be indicated by the SFI are shown in Table 3, below.

TABLE 3

| format | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |

TABLE 3-continued

| format | \multicolumn{14}{c}{Symbol number (or index) in one slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |
| 62-254 | \multicolumn{14}{c}{Reserved} |
| 255 | \multicolumn{14}{l}{UE determines the slot format for the slot based on tdd-UL-DL-ConfigurationCommon, tdd-UL-DL-ConfigurationCommon2, or tdd-UL-DL-ConfigDedicated and, if any, on detected DCI formats} |

In Table 3, D refers to a DL, U refers to a UL, and X refers to a flexible symbol. In Table 3, the total number of supportable slot formats is 256. In a current NR system, a maximum size of an SFI information bit is 128 bits, and the SFI information bit may be configured, by the BS, to the UE by using the upper signal (e.g., dci-PayloadSize).

The SFI information may include slot formats about a plurality of serving cells, and the serving cells may be distinguished therebetween based on serving cell IDs. For each serving cell, a slot formation combination of SFIs with respect to one or more slots may be included. For example, when the SFI information bit has a size of 3 bits and is composed of an SFI of about one serving cell, the SFI information of 3 bits may configure 8 SFIs or 8 slot format combinations (hereinafter, the SFI), and the BS may indicate one SFI from among the 8 SFIs by using UE group common DCI (hereinafter, SFI information).

At least one SFI from among the 8 SFIs may be configured as an SFI about a plurality of slots. For example, Table 4, below, shows an example of 3-bit SFI information composed of slot formats of Table 3. 5 (slot format combination ID 0, 1, 2, 3, and 4) of the SFI information are SFIs about one slot, and 3 (slot format combination ID 5, 6, and 7) of the SFI information are SFIs about four slots, which are sequentially applied to the four slots.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The UE receives configuration information about a PDCCH for which SFI information is to be detected by using an upper signal, and detects an SFI according to the configuration. For example, the UE is configured, by the upper signal, with respect to a CORESET and a search space from which the SFI information is to be detected, with respect to RNTI information used in CRC scrambling on the DCI transmitting the SFI information, or with respect to a period and offset information of the search space.

Figure 4:
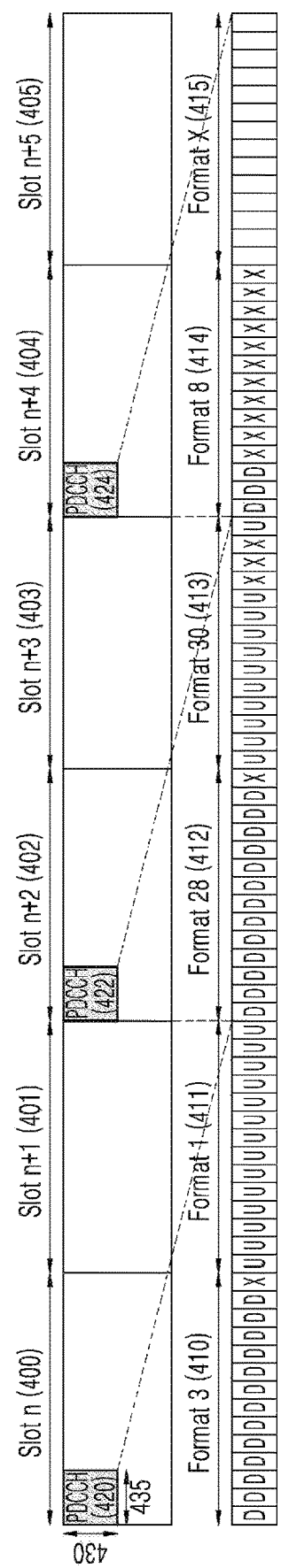
FIG. 4 illustrates slot format indicator (SFI) information in the NR system, according to an embodiment.

FIG. 4 illustrates slot format indicator (SFI) information in the NR system, according to an embodiment.

Referring to FIG. 4, PDCCH regions 420, 422, and 424 from which the UE is required to detect SFI information, and a period of the PDCCH regions 420, 422, and 424 is 2 slots. In other words, the UE may detect DCI that is CRC scrambled by a SFI identifier (hereinafter, SFI-RNTI) from the PDCCH regions 420, 422, and 424 in a slot n 400, a slot n+2 402, and a slot n+4 404, according to the PDCCH regions 420, 422, and 424 and the period. The UE may obtain, from the detected DCI, an SFI of about two slots. In this regard, the detected DCI may include SFI information about two or more slots, and how many slots are to be indicated by an included SFI may be configured by the upper signal. Configuration information about how many slots are to be indicated by the included SFI may be included in a same upper signal that configures the SFI information. For example, FIG. 4 illustrates a case in which the UE obtained two pieces of SFI information 410 and 411 about the slot n 400 and a slot n+1 401 from the PDCCH region 420 of the slot n 400. In this regard, a plurality of pieces of SFI information 410, 411, 412, 413, and 414 refer to formats shown in Table 3.

When SFI information is transmitted in the unlicensed band, in particular, when the SFI information includes SFIs about a plurality of slots, the BS may not determine the SFI information about at least one slot, when failing to access a channel in the unlicensed band.

In other words, referring to FIG. 4, when the BS performs a channel access procedure on the unlicensed band before the slot n 400 and determines that the unlicensed band is an idle channel according to a result of the channel access procedure, and then occupies and uses channels from the slot n 400 to the slot n+4 404, the BS cannot estimate a channel access procedure result with respect to the unlicensed band in a slot n+5 405. Thus the BS cannot determine an SFI of the slot n+5 405. In other words, when the BS transmits two pieces of SFI information 414 and 415 about the slot n+4 404 and the slot n+5 405 in the PDCCH region 424, a method is required to determine SFI information of the slot n+5 405.

Therefore, in the disclosure, there is need for a method of determining SFI information and a method of transmitting and receiving the determined SFI information, the methods being performed by the BS and the UE that are configured to determine a structure of a slot by using an SFI in an unlicensed band.

A method and apparatus may be used for determining SFI information. Also, it is assumed that the BS transmits SFI information to the UE by using DCI, and the UE receives and uses the SFI information, but the UE may also transmit SFI information to the BS by using uplink control information (UCI), and the BS may receive and use the SFI information. In addition, it is assumed that the BS and the UE operate in an unlicensed band, but it is also possible that the BS and the UE operate in a licensed band or a shared spectrum.

Also, it is assumed that SFI information is transmitted to a specified UE or a UE of a specified group via a PDCCH, but SFI information (or UL-DL-configuration information) that is transmitted to the UE by using an upper signal may also be used.

Also, it is assumed that the UE receives a DL data channel (also referred to as a PDSCH) from the BS. However, the UE may also transmit a UL data channel (also referred to as a PUSCH) to the BS. Also, it is assumed that SFIs about a plurality of slots are simultaneously transmitted, but a case in which an SFI about one slot is transmitted is also possible.

It is assumed that an SFI indicating whether a symbol included in at least one slot is a UL symbol, a DL symbol, or a flexible symbol may be interchangeably used as the SFI or slot configuration information. In addition, because an unlicensed band channel occupancy time of the BS or the UE may be indicated by the SFI, the SFI may also be expressed as channel occupancy time information.

An embodiment of the disclosure provides a method of determining a time of transmitting and receiving channel occupancy time information or SFI information, the method being performed by the BS and the UE that operate in the unlicensed band. In particular, the BS may access the unlicensed band and transmit SFI information independently from a PDCCH region that is pre-configured for receiving an SFI by using an upper signal, and thus the UE may promptly determine channel occupancy time information or slot configuration information in the channel occupancy time information of the BS.

The BS may allow, according to PDCCH related configuration information about a PDCCH for which SFI information is to be transmitted, the UE to determine a reception region of the PDCCH, for which the SFI information is to be transmitted, and a reception operation. The PDCCH related configuration information may include at least one of PDCCH reception frequency region information, a PDCCH reception symbol number, a PDCCH reception period, or offset information.

Figure 5:
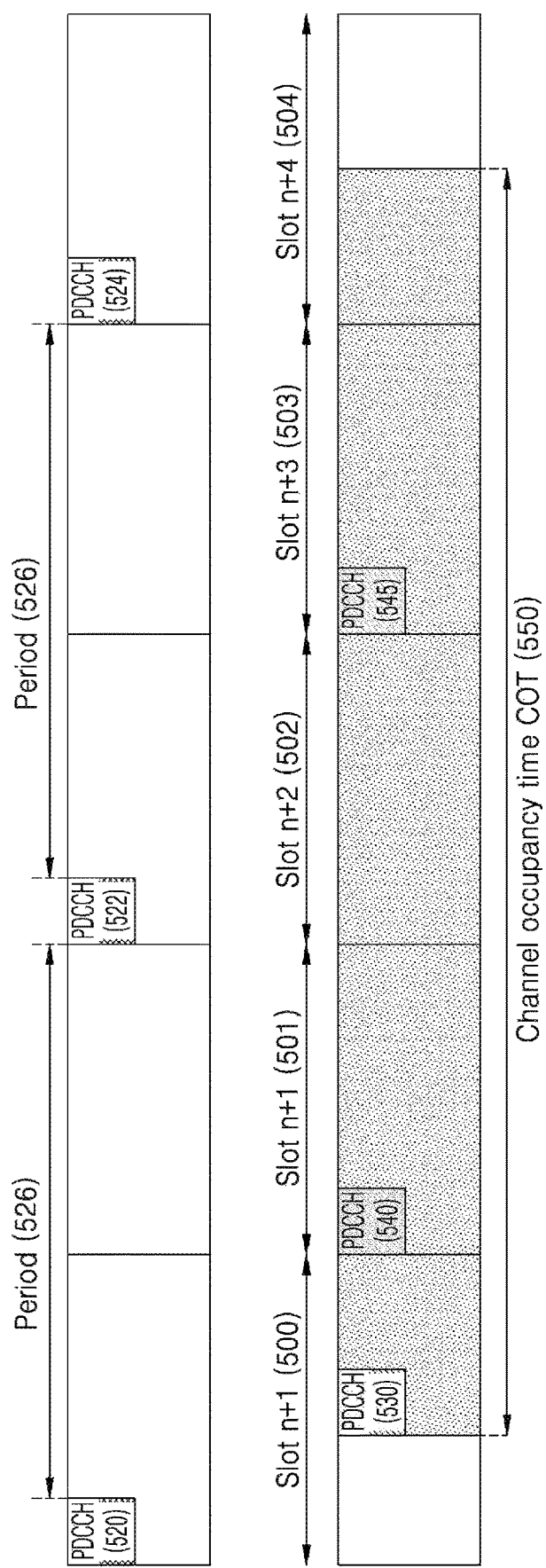
FIG. 5 is a diagram for describing a period of providing SFI information, according to an embodiment.

FIG. 5 is a diagram for describing a period of providing SFI information, according to an embodiment.

Referring to FIG. 5, the UE may receive, from the BS via an upper signal, a resource region, a period, or offset information, of the PDCCH, for which the SFI information is to be transmitted, and may obtain the SFI information by periodically monitoring the PDCCH region, for which the SFI information is to be transmitted, according to a configuration. However, when the BS transmits the SFI information via the unlicensed band, a time or a slot in which the SFI information is transmittable may be limited according to whether the BS accesses a channel.

In other words, as illustrated in FIG. 5, in a case where a PDCCH, for which SFI information is to be transmitted, is configured as PDCCH regions 520, 522, and 524, when the BS accesses the unlicensed band at a random symbol of a slot n 500 by performing a channel access procedure and transmits and receives a signal, an earliest time for transmitting SFI information is a slot n+2 502. Whether the UE is to perform a pre-configured signal transmitting and receiving operation may vary according to the SFI information, thus it is efficient for the SFI information to be transmitted immediately after the BS accesses the channel. Therefore, provided is a method, performed by the BS, of accessing the unlicensed band via the channel access procedure and transmitting SFI information at an earliest time for transmitting a DL control channel.

Referring to FIG. 5, the BS performs the channel access procedure, and when the BS determines that the unlicensed band is an idle channel, the BS accesses the unlicensed band and transmits a DL signal. Here, the BS may transmit, to the UE in the unlicensed band, SFI information via a PDCCH at an earliest time for transmitting a DL control channel. In other words, referring to FIG. 5, PDCCH transmission regions configured with the UE are a slot n 500, a slot n+2 502, and a slot n+4 504, but, after the BS accesses the channel, the BS needs a method of transmitting SFI information at an earliest time (see reference numeral 530 in FIG. 5) for transmitting a DL control channel.

In other words, the UE may be configured, by an upper signal, in every X slot or every Y symbol, with respect to a PDCCH reception period for a PDCCH transmitting SFI information. In this regard, X or Y may be pre-defined between the BS and the UE. Also, the UE may be configured with respect to a plurality of reception periods for the PDCCH transmitting SFI information, and may apply the intervals differently according to whether the BS occupies a channel. For example, X1 or Y1 may be a PDCCH reception period within a channel occupancy time of the BS, and X2 or Y2 may be a PDCCH reception period in a time except for the channel occupancy time of the BS. Describing PDCCH reception in a slot period, X1 may be a value 526, a period of which has a plurality of slots, and X2 may be a value, a period of which is every slot or one or more symbols. In this regard, the X1 period may be applied with respect to a slot from which the UE obtained SFI information. In other words, as illustrated in FIG. 5, the UE that received a PDCCH in a slot n+1 501 may search for and obtain SFI information in a slot n+3 503 after the X1 period (the value 526) with respect to the slot n+1 501. In other words, the UE may be separately configured with respect to a first reception period to a first resource region of a PDCCH via which the SFI information is transmitted a time or a slot in which SFI information is not received in a time except for the channel occupancy time of the BS, or a second reception period to a second resource region of the PDCCH via which the SFI information is transmitted in the channel occupancy time of the BS. In this regard, the UE is configured to determine the second resource region of the PDCCH via which the SFI information is transmitted in the channel occupancy time of the BS, based on a start time point or a start slot of the channel occupancy time of the BS, such that the SFI information may be rapidly transmitted.

In addition to a method of configuring and determining a period or a transmission resource region of the PDCCH via which the SFI information is transmitted, the disclosure may also be applied to a method of configuring and determining a period or a transmission resource region of a PDCCH, for which DCI other than the SFI information is transmitted. For example, the method may also be applied to a PDCCH, a CORESET, a common search space, or a UE-specific search space in which DCI for configuring DL data reception or UL data reception is transmitted.

An embodiment of the disclosure provides a method of determining a time of transmitting and receiving channel occupancy time information or SFI information, the method being performed by the BS and the UE that operate in an unlicensed band. In particular, according to the embodiment, the BS having accessed the unlicensed band is allowed to additionally transmit SFI information to a PDCCH region that is pre-configured for receiving an SFI by using an upper signal, and thus the UE may promptly determine channel occupancy time information of the BS or slot configuration information in the channel occupancy time information.

The BS may allow, by PDCCH related configuration information about a PDCCH for which SFI information is to be transmitted, the UE to determine a reception region of the PDCCH for which the SFI information is to be transmitted, and a reception operation. The PDCCH related configuration information may include at least one of PDCCH reception frequency region information, a PDCCH reception symbol number, a PDCCH reception period, or offset information.

Figure 6:
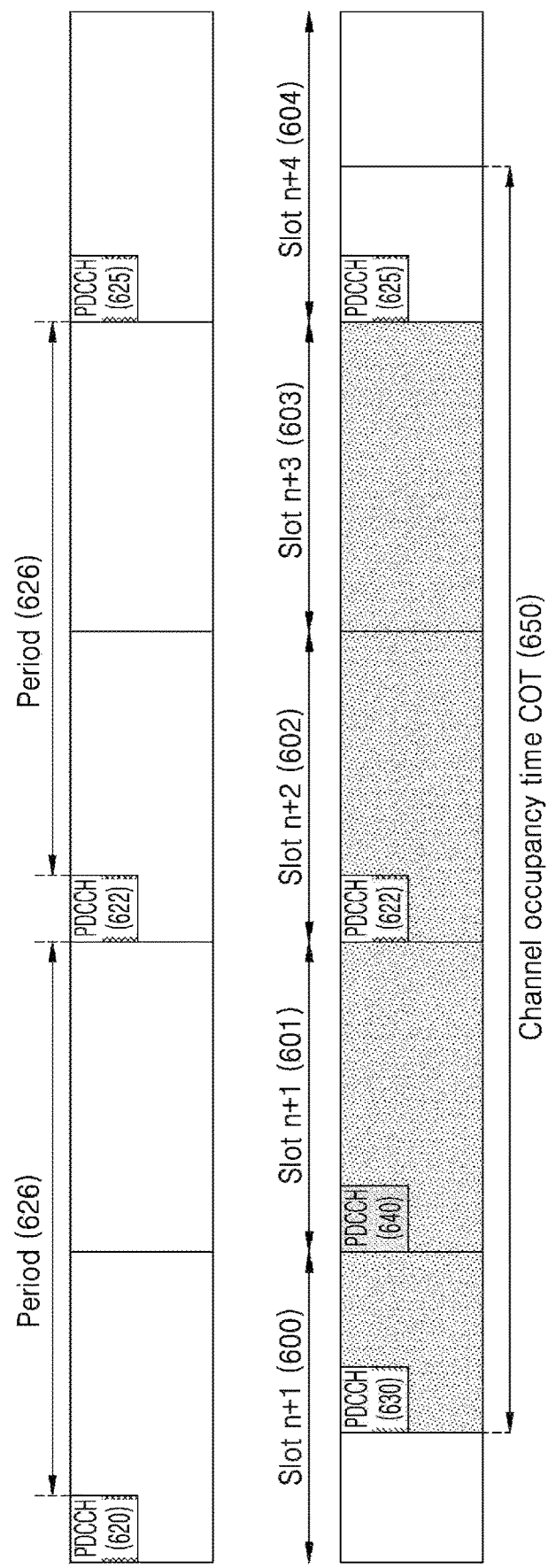
FIG. 6 is a diagram for describing a period of providing SFI information, according to an embodiment.

FIG. 6 is a diagram for describing a period of providing SFI information, according to an embodiment.

Referring to FIG. 6, the UE may receive, from the BS via an upper signal, time and frequency resource regions of the PDCCH, a period of the PDCCH, or offset information of the PDCCH for which the SFI information is to be transmitted, and may obtain the SFI information by periodically monitoring the PDCCH region, for which the SFI information is to be transmitted, according to a configuration. However, when the BS transmits the SFI information via the unlicensed band, a time or a slot in which the SFI information is transmittable may be limited according to whether the BS accesses a channel.

In other words, as illustrated in FIG. 6, in a case where a PDCCH, for which SFI information is to be transmitted, is configured as PDCCH regions 620, 622, and 625, when the BS accesses the unlicensed band at a random symbol of a slot n 600, by performing a channel access procedure, and transmits and receives a signal, an earliest time for transmitting SFI information is a slot n+2 602. Because whether the UE will or will not perform a pre-configured signal transmitting and receiving operation may vary according to the SFI information, it is efficient that the SFI information is transmitted immediately after the BS accesses the channel. Therefore, provided is a method, performed by the BS, of accessing the unlicensed band via the channel access procedure and transmitting SFI information at an earliest time for transmitting a DL control channel.

Referring to FIG. 6, the BS performs the channel access procedure, and when the BS determines that the unlicensed band is an idle channel, the BS accesses the unlicensed band and transmits a DL signal. Here, the BS may transmit, to the UE in the unlicensed band, SFI information via a PDCCH in an earliest time for transmitting a DL control channel. In other words, referring to FIG. 6, PDCCH transmission regions configured with the UE are a slot n 600, a slot n+2 602, and a slot n+4 604, but after the BS accesses the channel, the BS requires a method of transmitting SFI information at an earliest time (see reference numeral 630 or 640 in FIG. 6) for transmitting a DL control channel.

In other words, the BS additionally transmits the SFI information on a symbol or a slot except for a pre-configured PDCCH symbol or a pre-configured PDCCH slot for transmitting the SFI information. That is, after the BS performs a channel access procedure, the BS may transmit the SFI information on an earliest symbol or an earliest slot capable of transmitting a PDCCH. In this regard, time and frequency resources of a PDCCH for which the SFI information is additionally transmitted may be equal to a configuration of those of the PDCCH.

Accordingly, the UE may be configured with respect to a plurality of reception periods about the PDCCH transmitting SFI information, and may apply the intervals differently according to whether the BS occupies a channel. For example, X1 or Y1 may be a PDCCH reception period within a channel occupancy time of the BS, or a period configured for a PDCCH via which the SFI information is to be transmitted, regardless of the channel occupancy time of the BS. Additionally, X2 or Y2 may be a PDCCH reception period at a time except for the channel occupancy time of the BS.

Describing PDCCH reception in a slot period, X1 may be a value 626, a period of which has a plurality of slots and may be the PDCCH reception period within the channel occupancy time. X2 may be a value, a period of which is every slot. In this regard, a pre-configured period may be applied as the X1 period, regardless of a slot from which the UE obtained SFI information. In other words, as in FIG. 6, the UE that received a PDCCH in a slot n 600 or a slot n+1 601 may search for and obtain the SFI information in pre-configured reception slots n+2 602 and n+4 604, according to a PDCCH period 626 in which a pre-configured SFI is transmitted. Accordingly, the UE may be separately configured with respect to a first reception period to a first resource region of a PDCCH, for which the SFI information is transmitted at a time or a slot in which SFI information is not received at a time except for the channel occupancy time of the BS, or a second reception period to a second resource region of the PDCCH, for which the SFI information is transmitted in the channel occupancy time of the BS. In this regard, the UE is configured to determine the second resource region of the PDCCH, for which the SFI information is transmitted in the channel occupancy time of the BS, based on a start time point or a start slot of the channel occupancy time of the BS, such that the SFI information may be rapidly transmitted.

While the disclosure has been described with respect to a method of configuring and determining a period or a transmission resource region of the PDCCH via which the SFI information is transmitted, the method may also be applied to configuring and determining a period or a transmission resource region of a PDCCH for which DCI other than the SFI information is transmitted. For example, the method may also be applied to a PDCCH, a CORESET, a common search space, or a UE-specific search space, in which DCI for configuring DL data reception or UL data reception is transmitted.

An embodiment of the present disclosure provides a method of configuring channel occupancy time information or SFI information, the method being performed by the BS from among the BS and the UE that operate in the unlicensed band. In the unlicensed band, the BS may perform a channel access procedure, and when the BS accesses a channel according to a result of the channel access procedure, the BS may schedule DL signal transmission and UL signal transmission of the UE in an MCOT. In this regard, the BS may transmit a slot format of a slot in the MCOT to the UE via a PDCCH, i.e., the BS may transmit an SFI indicating whether each symbol constituting a slot is a DL symbol, a UL symbol, or a flexible symbol. In this regard, SFI information (or SFI-DCI) that is transmitted via the PDCCH may include SFIs about a plurality of slots, and the number of SFIs to be transmitted in the SFI information may be configured based on the MCOT and subcarrier spacing (SCS).

For example, when the MCOT is 4 ms, and the SCS is 15 kHz, a maximum of 4 slots may be included in the MCOT. Therefore, SFI information that is transmitted via the PDCCH in a cell or a BWP in which the MCOT is configured to be 4 ms and the SCS is configured to be 15 kHz may include SFI information about at least 4 slots. In this regard, the UE that received the SFI information may determine a channel occupancy time (COT) of the BS and the slot format based on the SFI information.

However, because the BS may transmit a signal by accessing the unlicensed band at a random symbol in a slot, i.e., when the BS is able to transmit a DL signal on a first symbol and a next symbol of a slot in the unlicensed band, an additional SFI for one slot may be required.

That is, SFI information including SFIs with a maximum of 5 slots may be required. For example, referring to FIG. 5, in a case where a COT 550 of the BS is 4 ms, and the BS transmits a signal by 15 kHz of SCS, when the BS is able to transmit a DL signal on a symbol after a first symbol in a slot n 500 in the unlicensed band, SFI information is required, the SFI information including SFIs about 5 slots from the slot n 500 to a slot n+4 504. In other words, the number of slots (N) that are indicative by SFIs of SFI information may be configured to be more than the number of slots included in an MCOT. This may be determined by using Equation (2) or Equation (3), below.

$$N=N\_\text{slot per } MCOT\_p\_u+1 \text{ or } N=\max(N\_\text{slot per } MCOT\_p\_u+1), p=1,2,3,4 \qquad (2)$$

N_slot per MCOT_p_u indicates the number of slots included in an MCOT with respect to subcarrier spacing u and priority class p. When a signal to be transmitted and received includes a signal corresponding to a plurality of priority classes, or is capable of dynamically selecting a priority class, N_slot per MCOT_p_u may be a largest number from among a number of slots included in the MCOT with respect to the plurality of priority classes, or may be a number of slots included in the MCOT with respect to a highest priority class p (or p with a lowest priority class). In other words, N_slot per MCOT_p indicates the number of slots included in MCOT_4 with respect to a priority class 4, for which a priority class is highest or for which a priority class is lowest, from among priority classes 1, 2, 3, and 4.

$$N=(MCOT\_p/ms)*N\_\text{slot per subframe}\_u+1 \text{ or } N=\max(MCOT\_p/ms)*N\_\text{slot per subframe}\_u+1, p=1,2,3,4 \qquad (3)$$

N_slot per subframe_u indicates the number of slots included in a subframe 1 ms with respect to subcarrier spacing u, and MCOT_p indicates an MCOT with respect to a priority class p. When a signal to be transmitted and received corresponds to at least one of a case where the signal includes a plurality of priority classes or a case where the signal may dynamically select and use a priority class, MCOT_p may be a largest MCOT with respect to the plurality of classes p, or may be an MCOT with respect to a highest priority class p (or p with a lowest priority class). In other words, MCOT_p indicates MCOT_4 with respect to a priority class 4, for which a priority class is highest or for which a priority is lowest, from among priority classes 1, 2, 3, and 4.

In this regard, an MCOT may be a value defined according to unlicensed band frequencies or regional limitations, or may be a value pre-defined between the BS and the UE, and a value of the MCOT may be defined differently according to priority classes used in a channel access procedure performed by the BS or the UE to transmit a signal via the unlicensed band.

Because the BS or the UE can arbitrarily change a COT of the unlicensed band within an MCOT, the UE may determine, by using the MCOT, the number of slots of which slot formats are indicated by SFI information. The UE may fix a size or the number of bits of the SFI information by fixing, by using the MCOT, the number of slots of which slot formats are indicated by the SFI information. Accordingly, a size of the SFI information is not changed according to a channel access time, a priority class, or the MCOT of the BS or the UE. Thus, the UE may detect the SFI information having one size, thereby minimizing a complexity of the UE.

In this regard, N or N+1 determined according to Equation (2) or (3) may be the maximum number of slots whose slot formats may be indicated by SFI information, and the SFI information may include SFIs for indicating slot formats of slots, the number of the slots being less than N or N+1. In other words, at least one piece of information of the SFI information is configured as SFIs for indicating slot formats of N slots or N+1 slots determined according to Equation (2) or (3). For example, one piece of information of the SFI information is configured as SFIs for N+1 slots, and another piece of information of the SFI information is configured as SFIs for N slots or less.

With respect to a slot whose slot format is not indicated by the SFI information, the UE may determine that the slot is composed of only flexible symbols.

In this regard, the BS may transmit a slot format of a slot in the MCOT to the UE via a PDCCH, i.e., the BS may transmit an SFI indicating whether each symbol constituting a slot is a DL symbol, a UL symbol, or a flexible symbol. In this regard, SFI information (or SFI-DCI) that is transmitted via the PDCCH may include SFIs about a plurality of slots, and the number of SFIs to be transmitted in the SFI information may be configured based on the MCOT and SCS. When the BS transmits SFI information including SFIs about one or more slots to the UE via the PDCCH, the BS may indicate that a time or a symbol before or after the MCOT is a flexible time or a flexible symbol.

In other words, the BS cannot estimate a result of a channel access procedure performed before a time of accessing a channel of the unlicensed band, or performed in a time or a symbol after the MCOT. Thus, the BS cannot determine what to use as the time or the symbol before or after the MCOT, from among a DL symbol and a UL symbol. Therefore, when the BS is required to transmit SFI information about the time or the symbol before or after the MCOT, the BS may indicate the time or the symbol to be a flexible symbol, and may additionally indicate, after accessing a channel, whether the flexible symbol is a UL symbol or a DL symbol.

Figure 7:
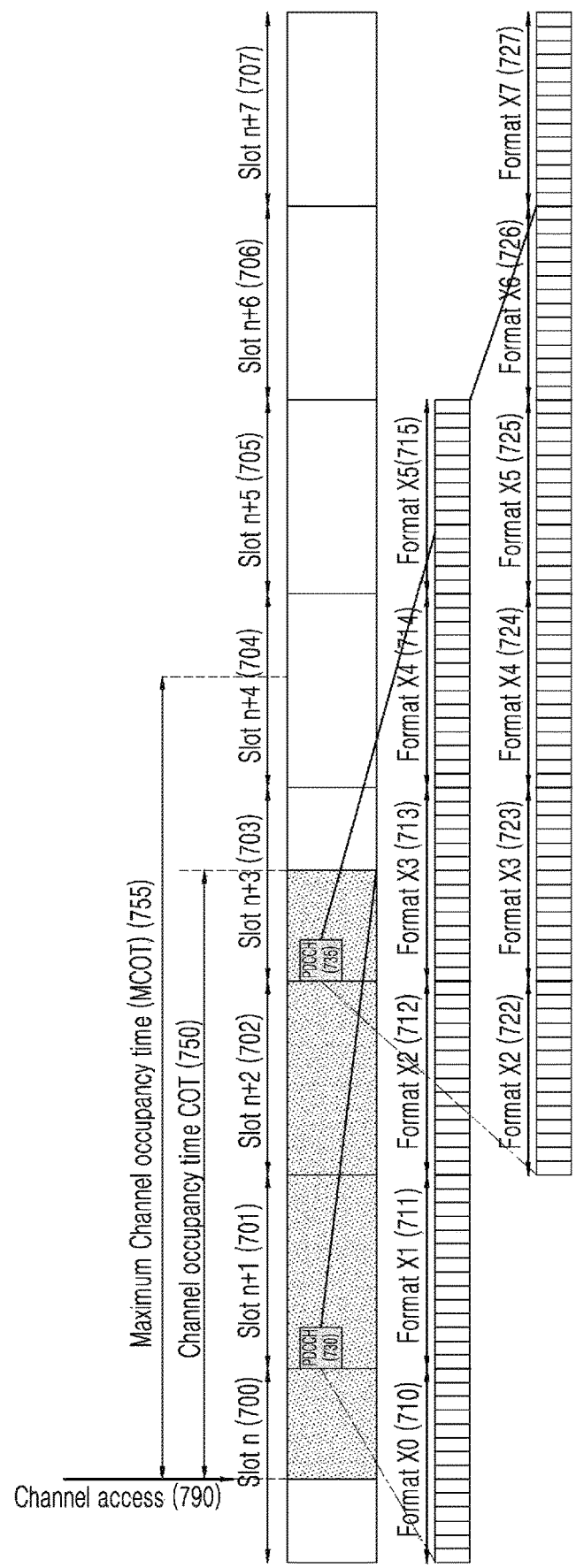
FIG. 7 is a diagram for describing the number of slots whose slot format is indicated, the number being included in SFI information, according to an embodiment.

FIG. 7 is a diagram for describing the number of slots whose slot format is indicated, the number being included in SFI information, according to an embodiment.

Referring to FIG. 7, the BS may perform a channel access procedure so as to transmit and receive a signal via an unlicensed band, and when the BS determines that the unlicensed band is in an idle state in a certain time or symbol of a slot n 700, the BS may access the unlicensed band and may transmit and receive a signal during a period from initiation of a channel access time 790 to an MCOT 755 or a specific COT 750 within the MCOT 755.

FIG. 7 illustrates a case in which, when the MCOT 755 is 4 ms, the BS occupies a channel during 3 ms 750, starting from the initiation of the channel access time 790, and transmits and receives a signal. The BS may transmit, to the UE via a PDCCH, SFI information about a slot within the MCOT 755 in PDCCH regions 730 and 735, the SFI information being determined according to the aforementioned method. In other words, SFIs 710, 711, 712, 713, and 714 for 5 slots (N=5) is calculated using aforementioned Equation (2) or (3), and may be transmitted via a PDCCH 730. In this regard, a slot whose slot format is indicated by SFI information may be determined by using the methods described below based on a PDCCH for which an SFI is transmitted.

With reference to FIG. 7, a method will be described based on a PDCCH transmission slot, where SFIs about N slots starting from a slot before X slot are sequentially indicated.

The BS transmits, to the UE via the PDCCH, the SFI information about the slot within the MCOT 755 in the PDCCH regions 730 and 735. In this regard, the SFI information may include SFIs about N slots (N=5 in FIG. 7) from a slot before X slot (X=1 in FIG. 7) with respect to a slot n+1 701 or a slot n+3 703 in which the PDCCH is transmitted. That is, as illustrated in FIG. 7, SFI information transmitted in the PDCCH region 730 of the slot n+1 701 may include SFIs about respective slots between a slot n 700 and a slot n+4 704, and SFI information transmitted in the PDCCH region 735 of the slot n+3 703 may include SFIs about respective slots between a slot n+2 702 and a slot n+6 706.

The method of indicating an SFI from a slot before X slot with respect to a slot in which SFI information is transmitted may be used to indicate, to the UE, an SFI about a slot including an initiation time or symbol of a channel access by the BS, when SFI information is transmitted in a slot after the initiation time or symbol of the channel access by the BS. The UE may perform, by using the SFI information, additional operations including an operation of determining whether to perform a channel quality measurement or a channel quality value compensation operation.

In a case where the UE measured a channel quality of a symbol from among symbols between a first symbol and a sixth symbol of the slot n 700, when the symbol for which a channel quality has been measured is indicated as a flexible symbol, based on SFI information about the slot n 700 which is indicated by the BS, the UE may not use information about the measured channel quality.

The BS may indicate an SFI (e.g., a format X0 710) in the SFI information transmitted via the PDCCH 730 transmitted in the slot n+1 701. The SFI indicating that the first symbol through the sixth symbol of the slot n 700 are flexible symbols, and a seventh symbol through a fourteenth symbol of the slot n 700 are one or more UL or DL symbols.

Also, the BS may indicate an SFI (e.g., a format X3 713) indicating that a first symbol through a seventh symbol of the slot n+3 703 are one or more UL or DL symbols, and an eighth symbol through a fourteenth symbol of the slot n+3 703 are flexible symbols. Also, the BS may indicate an SFI (e.g., a format X4 714) indicating that a first symbol through a fourteenth symbol of the slot n+4 704 are flexible symbols. In this regard, for the slot n+1 701 and the slot n+2 702, the BS may indicate SFIs (e.g., formats X2 and X4) indicating that a first symbol through a fourteenth symbol are one or more UL or DL symbols.

Also, the BS may transmit SFI information about the slot n+2 702 through the slot n+6 706 via the PDCCH 735 transmitted in the slot n+3 703, and may indicate an SFI (e.g., a format X2 722) indicating that a first symbol through a fourteenth symbol of the slot n+2 702 are one or more UL or DL symbols, and may indicate an SFI (e.g., a format X3 723) indicating that a first symbol through a seventh symbol of the slot n+3 703 are one or more UL or DL symbols, and an eighth symbol through a fourteenth symbol of the slot n+3 703 are flexible symbols.

In this regard, when SFIs about a specific slot are transmitted via different PDCCHs, the SFIs indicated via the different PDCCHs may be the same. That is, the SFI X2 712 transmitted via the PDCCH 730 and the SFI X2 722 transmitted via the PDCCH 735 have to indicate a same value. In other words, when the BS transmits the SFIs about the specific slot via the PDCCHs 730 and 735 that are different from each other within a channel access time 750, the BS may indicate a same SFI (e.g., the format X3 713).

Accordingly, the UE does not assume that different SFIs about a specific slot are indicated via different PDCCHs within a channel access time of the BS. However, in a case of PDCCHs that are transmitted in different channel access time periods, a specific slot may be indicated by different SFIs. That is, via a PDCCH transmitted in a previous channel access time, the BS may indicate an SFI indicating that all symbols are flexible symbols for a specific slot (e.g., a slot including symbols before or after a channel access time of the BS), but after the channel access time, when the BS performs a channel access procedure and thus obtains a new COT, the BS may indicate, via a PDCCH transmitted in the obtained COT, an SFI indicating one or more UL or DL symbols for a specific slot.

According to a method, a plurality of pieces of SFI information about N slots starting from a PDCCH transmission slot are sequentially indicated. In particular, the BS transmits, to the UE via the PDCCH, SFI information including SFIs about slots within the MCOT 755 in the PDCCH regions 730 and 735. In this regard, the SFI information may sequentially include SFIs about N slots (N=5 in FIG. 7) with respect to the slot n+1 701 or the slot n+3 703 in which the PDCCH is transmitted.

That is, referring to FIG. 7, SFI information transmitted in the PDCCH region 730 of the slot n+1 701 includes SFIs about respective slots between the slot n+1 701 and the slot n+5 705, and SFI information transmitted in the PDCCH region 735 of the slot n+3 703 includes SFIs about respective slots between the slot n+3 703 and the slot n+7 707, such that two pieces of the SFI information may be transmitted via respective PDCCHs. When the method of sequentially including SFIs from a transmission slot in SFI information is used, the UE may determine or assume that a time or a symbol before the SFI information is transmitted is made up of all flexible symbols.

Accordingly, the BS may indicate SFIs in SFI information transmitted via the PDCCH 730 transmitted in the slot n+1 701, the SFIs (e.g., formats X1 and X2) indicating that a first symbol through a fourteenth symbol of the slot n+1 701 and the slot n+2 702 are one or more UL or DL symbols. Also, the BS may indicate the SFI (e.g., the format X3 713) indicating that a first symbol through a seventh symbol of the slot n+3 703 are one or more UL or DL symbols, and an eighth symbol through a fourteenth symbol of the slot n+3 703 are flexible symbols. Also, the BS may indicate SFIs (e.g., the format X4 714 and a format X5 715) indicating that a first symbol through a fourteenth symbol of the slot n+4 704 and the slot n+5 705 after the COT 750 are flexible symbols.

Also, the BS may transmit SFI information about the slot n+3 703 through the slot n+7 707 via the PDCCH 735 transmitted in the slot n+3 703, may indicate the SFI (e.g., the format X3 723) indicating that a first symbol through a seventh symbol of the slot n+3 703 are one or more UL or DL symbols, and an eighth symbol through a fourteenth symbol of the slot n+3 703 are flexible symbols, and may indicate SFIs (e.g., formats X4 724, X5 715, X6 726, and X7 727) indicating that a first symbol through a fourteenth symbol of the slot n+3 703 through the slot n+7 707 are flexible symbols.

In this regard, when SFIs about a specific slot are transmitted via different PDCCHs, the SFIs may indicate a same value. That is, the SFI X2 712 transmitted via the PDCCH 730 and the SFI X2 722 transmitted via the PDCCH 735 indicate a same value. In other words, when the BS transmits the SFIs about the specific slot via different PDCCHs within a COT, the BS may indicate a same SFI. That is, the UE does not assume that different SFIs about a specific slot are indicated via different PDCCHs within a channel access time of the BS. However, in a case of SFI information that is transmitted via PDCCHs transmitted in different channel access time periods, a specific slot may be indicated by different SFIs. That is, for a PDCCH transmitted in a previous channel access time, the BS may indicate an SFI indicating that all symbols are flexible symbols for a specific slot (e.g., a slot including symbols before or after a channel access time of the BS), but after the channel access time, when the BS performs a channel access procedure and thus obtains a new COT, the BS may indicate, via a PDCCH transmitted in the obtained COT, an SFI indicating one or more UL or DL symbols for a specific slot.

In this regard, the UE may determine that symbols or slots that are indicated to be flexible and are sequential from the end from among slots whose slot formats are indicated based on the received SFI information are not included in a COT of the BS. In other words, the UE may determine that the slot 704 or symbols which are sequentially indicated to be flexible from the end (slot 704) from among the slots 700, 701, 702, 703, and 704, whose slot formats are indicated based on the SFI information received via the PDCCH 730 of FIG. 7, or the slot 704 and symbols (eighth symbol through fourteenth symbol of the slot 703) which are sequentially indicated to be flexible from the end (slot 704) are symbols or a slot which is not included in the COT of the BS.

Provided is a method of configuring channel occupancy time information or SFI information, the method being performed by the BS from among the BS and the UE that operate in the unlicensed band. When the BS transmits SFI information more than once via a PDCCH in different time periods within a COT, the BS transmits the same SFI information.

In a case where an SFI for a specific slot is transmitted, when transmission of SFIs about the specific slot is required via different PDCCHs, the SFIs about the specific slot may be same. However, because the BS cannot previously estimate or determine SFI information about a slot after an MCOT, when SFIs about a specific slot are transmitted via different PDCCHs within a COT, the BS may indicate a same SFI.

Accordingly, the BS may transmit offset information along with SFI information, thereby allowing the UE that has received the SFI information to correctly determine a slot whose slot format is indicated by the SFI information. In this regard, the offset information may be slot unit information or symbol unit information which is a value indicating a difference between a slot at which the SFI information is received and a first slot whose slot format is indicated by the SFI information.

The BS may perform a channel access procedure in the unlicensed band, may access a channel according to a result of the channel access procedure, and may schedule DL signal transmission and UL signal transmission in an MCOT. In this regard, the BS may transmit a slot format of a slot in the MCOT to the UE via a PDCCH, i.e., the BS may transmit an SFI indicating whether each symbol constituting a slot is a UL symbol, a DL symbol, or a flexible symbol.

In this regard, SFI information (or SFI-DCI) that is transmitted via the PDCCH may include SFIs about a plurality of slots, and the number of SFIs to be transmitted in the SFI information may be configured based on the MCOT and SCS.

For example, when the MCOT is 4 ms, and the SCS is 15 kHz, a maximum of 4 slots may be included in the MCOT. Therefore, SFI information that is transmitted via the PDCCH in a cell or a BWP in which the MCOT is configured to be 4 ms and the SCS is configured to be 15 kHz may include SFIs about at least 4 slots. In this regard, the UE that received the SFI information may determine a COT of the BS and the slot format, based on the SFI information.

However, because the BS may transmit a signal by accessing the unlicensed band at a random symbol in a slot, i.e., when the BS is able to transmit a DL signal on a first symbol and a next symbol of a slot in the unlicensed band, an additional SFI for one slot may be required.

That is, in the aforementioned example, SFI information including SFIs about a maximum of 5 slots may be required. For example, referring to FIG. 8, in a case where a COT 850 of the BS is 4 ms, and the BS transmits a signal by 15 kHz of SCS, when the BS is able to transmit a DL signal on a symbol after a first symbol in a slot n 800 in the unlicensed band, SFI information is required. The SFI information may include SFIs of about 5 slots from the slot n 800 to a slot n+4 804. In other words, the number of slots (N) that indicate SFIs of SFI information may be configured to be greater than the number of slots included in an MCOT. This may be determined by using Equation (4) or Equation (5), below.

$$N=N\_\text{slot per } MCOT\_p\_u+1 \text{ or } N=\max(N\_\text{slot per } MCOT\_p\_u+1), p=1,2,3, \text{ and } 4 \quad (4)$$

N_slot per MCOT_p_u indicates the number of slots included in an MCOT with respect to subcarrier spacing u and priority class p. When a signal to be transmitted and received corresponds to at least one of a case where the signal includes a plurality of priority classes or a case where the signal may dynamically select and use a priority class, N_slot per MCOT_p_u may be a largest number from among numbers of slots included in the MCOT with respect to the plurality of priority classes, or may be the number of slots included in the MCOT with respect to a highest priority class p (or p with a lowest priority class). In other words, N_slot per MCOT_p indicates the number of slots included in MCOT_4 with respect to a highest priority class or a lowest priority class from among priority classes 1, 2, 3, and 4.

$$N=(MCOT\_p/ms)*N\_\text{slot per subframe}\_u+1 \text{ or } N=\max(MCOT\_p/ms)*N\_\text{slot per subframe}\_u+1, p=1,2,3, \text{ and } 4 \quad (5)$$

N_slot per subframe u indicates the number of slots included in a subframe 1 ms with respect to subcarrier spacing u, and MCOT_p indicates an MCOT with respect to a priority class p. When a signal to be transmitted and received corresponds to at least one of a case where the signal includes a plurality of priority classes or a case where the signal may dynamically select and use a priority class, MCOT_p may be a largest MCOT with respect to the plurality of classes p, or may be an MCOT with respect to a highest priority class p (or a lowest priority class). In other words, MCOT_p indicates MCOT_4 with respect to a highest priority class or a lowest priority class from among priority classes 1, 2, 3, and 4.

In this regard, an MCOT may be a value defined according to unlicensed band frequencies or regional limitations, or may be a value pre-defined between the BS and the UE, and a value of the MCOT may be defined differently according to priority classes used in a channel access procedure performed by the BS or the UE to transmit a signal via the unlicensed band.

Because the BS or the UE can arbitrarily change a COT of the unlicensed band within an MCOT, the BS or the UE may determine, by using the MCOT, the number of slots for which slot formats are indicated by SFI information. The UE may fix a size or the number of bits of the SFI information by fixing, using the MCOT, the number of slots of which slot formats are indicated by the SFI information. By doing so, a size of the SFI information is not changed according to a channel access time, a priority class, or the MCOT of the BS or the UE, and the UE may detect the SFI information having one size. Thus, a complexity of the UE may be reduced.

In this regard, N or N+1, determined according to Equation (4) or (5), may be the maximum number of slots whose slot formats may be indicated by SFI information, and the SFI information may include SFIs for indicating slot formats of slots, the number of the slots being less than N or N+1. In other words, at least one piece of information of the SFI information is configured as SFIs for indicating slot formats of N slots or N+1 slots determined according to Equation (4) or (5). For example, one piece of information of the SFI information is configured as SFIs for N+1 slots, and another piece of information of the SFI information is configured as SFIs for N slots or less.

With respect to a slot whose slot format is not indicated by the SFI information, the UE may determine that the slot is composed of only flexible symbols.

In this regard, the BS may transmit a slot format of a slot in the MCOT to the UE via a PDCCH, i.e., the BS may transmit an SFI indicating whether each symbol constituting a slot is a DL symbol, a UL symbol, or a flexible symbol. In this regard, SFI information (or SFI-DCI) that is transmitted via the PDCCH may include SFIs about a plurality of slots, and the number of SFIs to be transmitted in the SFI information may be configured based on the MCOT and SCS. When the BS transmits SFI information including SFIs about one or more slots to the UE via the PDCCH, the BS may indicate that a time or a symbol before or after the MCOT is a flexible time or a flexible symbol.

In other words, the BS cannot estimate a result of a channel access procedure performed before a time of accessing a channel to the unlicensed band, or performed in a time or a symbol after the MCOT, and thus, the BS cannot determine what to use, as the time or the symbol before or after the MCOT, from among a DL symbol and a UL symbol. Therefore, when the BS transmits SFI information more than once in different time periods within a COT, the BS transmits the same SFI information, and thus may not transmit SFI information about a time or a symbol after the MCOT.

Figure 8:
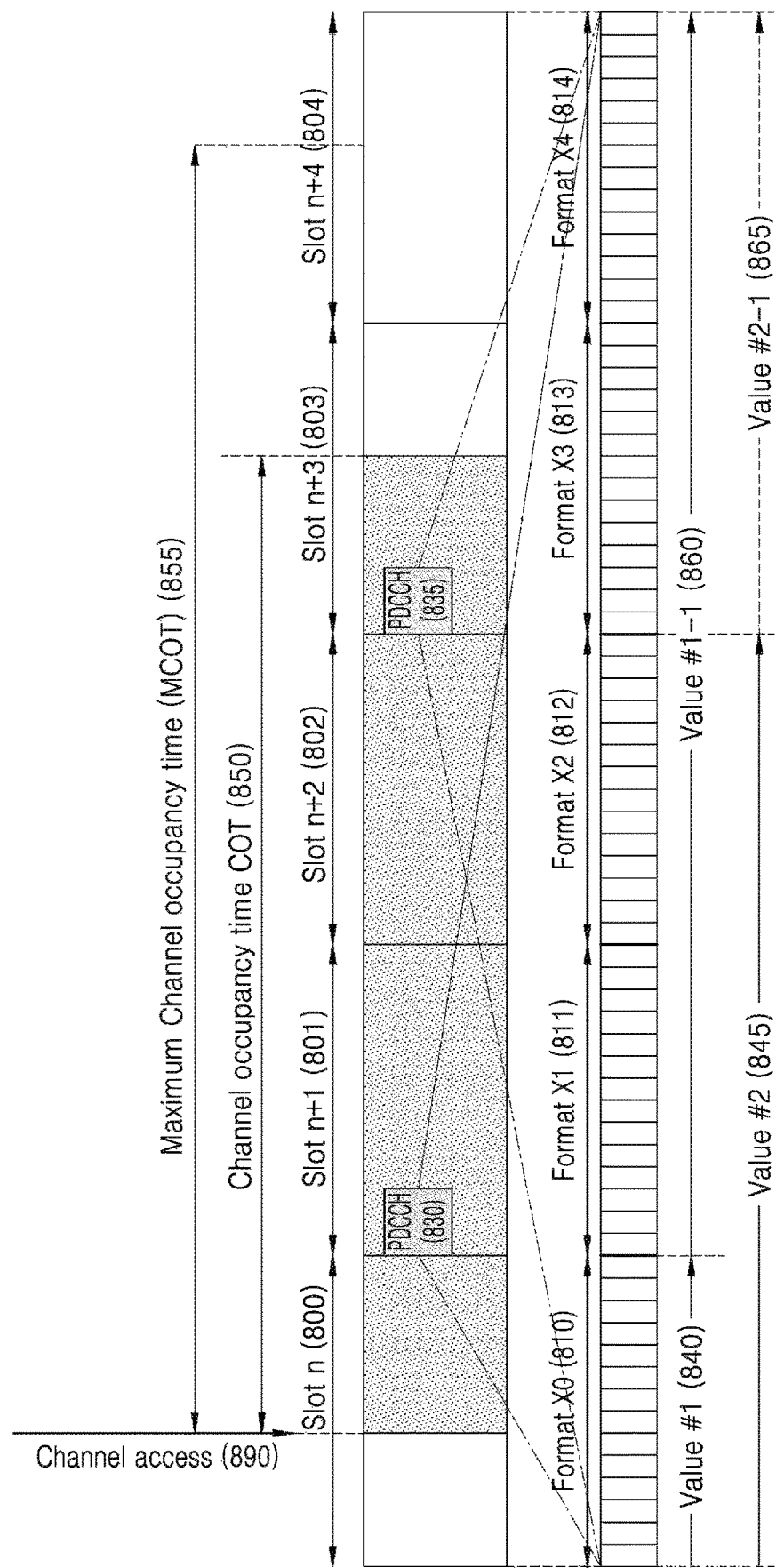
FIG. 8 is a diagram for describing offset information, according to an embodiment.

Referring to FIG. 8, the BS may perform a channel access procedure so as to transmit and receive a signal via an unlicensed band, and when the BS determines that the unlicensed band is in an idle state in a certain time or symbol of a slot n 800, the BS may access the unlicensed band and may transmit and receive a signal during a period from initiation of a channel access time 890 to an MCOT 855 or a specific COT 850 within the MCOT 855.

FIG. 8 illustrates a case in which, when the MCOT 855 is 4 ms, the BS occupies a channel during 3 ms 850 starting from the initiation of the channel access time 890, and transmits and receives a signal. The BS may transmit, to the UE via a PDCCH, SFI information about a slot within the MCOT 855 in PDCCH regions 830 and 835, the SFI information being determined or configured based on the above. In other words, SFI information including SFIs 810, 811, 812, 813, and 814 of about 5 slots (N=5) for the number of slots (N) is calculated by using aforementioned Equation (4) or (5). The SFI information may be transmitted via a PDCCH 830. In this regard, a slot whose slot format is indicated by SFI information may be determined by using the methods described below, based on a PDCCH and offset information for which an SFI is transmitted.

That is, when offset information (an offset Y) with SFI information are transmitted and the UE receives them, the UE may determine that SFIs indicate a slot format of N slots starting from a slot before a slot with the offset Y, with respect to a PDCCH reception slot in which the SFI information is received.

Referring to FIG. 8, the BS transmits, to the UE via the PDCCH, the SFI information about the slot within the MCOT 855 in the PDCCH regions 830 and 835. In this regard, the SFI information transmitted within a COT of the BS is the same, and the UE may determine a slot and an SFI corresponding to the slot, based on the SFI information and offset information received along with the SFI information, wherein a slot format of the slot is indicated by the SFI information. The offset information is information about a difference or an interval between a slot in which the PDCCH including the SFI information is received and a first slot whose slot format is indicated by the SFI information.

The same SFI information may be transmitted multiple times via different PDCCH transmission regions 830 and 835 within the COT 850 or the MCOT 855 of the BS. In this regard, because SFI information including SFIs about N slots (N=5 in FIG. 8) transmitted for the PDCCH transmission region 830 and SFI information including SFIs for N slots transmitted via the PDCCH transmission region 835 are same, the UE may determine a slot whose slot format is indicated by the SFI information, based on the SFI information and the offset Y received with the SFI information.

For example, when the UE receives the SFI information about the N slots via the PDCCH transmission region 830, the UE obtains an offset value 840 (Y=1) received with the SFI information. The UE may determine a slot n before the received offset 840 with respect to a slot n+1 in which the PDCCH including the SFI information is received is the first slot whose slot format is indicated by the SFI information. That is, the UE may determine that the slot whose slot format is indicated by the SFI information is from the slot n 800 to the slot n+4 804.

Also, when the UE receives an offset value 845 (Y=3) along with the SFI information about the N slots via the PDCCH transmission region 835, the UE may determine that the slot n before the received offset 845 with respect to a slot n+3 in which the PDCCH including the SFI information is received is a first slot whose slot format is indicated by the SFI information. That is, the UE may determine that the slot whose slot format is indicated by the SFI information is from the slot n 800 to the slot n+4 804.

The BS may indicate a SFI (e.g., a format X0 810) in the SFI information transmitted via the PDCCH 830 and the PDCCH 835 transmitted in a slot n+1 801 and a slot n+3 803, the SFI indicating that the first symbol through the sixth symbol of the slot n 800 are flexible symbols, and the seventh symbol through the fourteenth symbol of the slot n 800 are one or more UL or DL symbols.

Also, the BS may indicate an SFI (e.g., a format X3 813) indicating that the first symbol through the seventh symbol of the slot n+3 803 are one or more UL or DL symbols, and the eighth symbol through the fourteenth symbol of the slot n+3 803 are flexible symbols. Also, the BS may indicate an SFI (e.g., a format X4 814) indicating that the first symbol through the fourteenth symbol of the slot n+4 804 are flexible symbols. In this regard, the BS may indicate SFIs (e.g., formats X2 and X4) indicating that the first symbol through the fourteenth symbol of the slot n+1 801 and the slot n+2 802 are one or more UL or DL symbols. In addition, SFI information may be configured based on an MCOT, independently from a COT of the BS.

In this regard, the UE may determine that symbols or slots are indicated to be flexible and are sequential from the end from among slots whose slot formats are indicated based on the received SFI information and are not included in a COT of the BS. In other words, the UE may determine that the slot 804 or symbols which are sequentially indicated to be flexible from the end (slot 804) from among the slots 800, 801, 802, 803, and 804, whose slot formats are indicated based on the SFI information received via the PDCCH 830 of FIG. 8, or the slot 804 and symbols (eighth symbol through fourteenth symbol of the slot 803), which are sequentially indicated to be flexible from the end (slot 804), are symbols or a slot which is not included in the COT of the BS.

An embodiment of the present disclosure provides a method of configuring channel occupancy time information or SFI information, the method being performed by the BS from among the BS and the UE that operate in the unlicensed band. When the BS transmits SFI information more than once via a PDCCH in different time periods within a COT, the BS transmits SFI information and valid slot information.

In a case where an SFI for a specific slot is transmitted, when transmission of SFIs about the specific slot is required via different PDCCHs, the SFIs about the specific slot may be same. However, because the BS cannot previously estimate or determine SFI information about a slot after an MCOT, when SFIs about a specific slot are transmitted via different PDCCHs within a COT, the BS may indicate a same SFI.

To this end, the BS transmits valid slot information along with SFI information, thereby allowing the UE that has received the SFI information to correctly determine a slot whose slot format is indicated by the SFI information. In this regard, the valid slot information is information for indicating a slot or a symbol for determining a valid SFI from among slots whose slot format is indicated by the received SFI information. The UE may determine a slot or a symbol, which is not indicated as a valid slot from among the slots whose slot format is indicated by the received SFI information, as a flexible symbol or a flexible slot, or as a slot or a symbol whose slot format is not indicated. Hereinafter, it is assumed that the valid slot information is slot unit information, but the valid slot information may also be symbol unit information.

The BS may perform a channel access procedure in the unlicensed band, may access a channel according to a result of the channel access procedure, and may schedule DL signal transmission and UL signal transmission in an MCOT. In this regard, the BS may transmit a slot format of a slot in the MCOT to the UE via a PDCCH, i.e., the BS may transmit an SFI indicating whether each symbol constituting a slot is a UL symbol, a DL symbol, or a flexible symbol.

In this regard, SFI information (or SFI-DCI) that is transmitted via the PDCCH may include SFIs about a plurality of slots, and the number of SFIs to be transmitted in the SFI information may be configured based on the MCOT and SCS.

For example, when the MCOT is 4 ms, and the SCS is 15 kHz, a maximum of 4 slots may be included in the MCOT. Therefore, SFI information that is transmitted via the PDCCH in a cell or a BWP in which the MCOT is configured to be 4 ms and the SCS is configured to be 15 kHz may include SFIs about at least 4 slots. In this regard, the UE that received the SFI information may determine a COT of the BS and the slot format based on the SFI information.

However, because the BS may transmit a signal by accessing the unlicensed band at a random symbol in a slot, i.e., when the BS is able to transmit a DL signal on a first symbol and a next symbol of a slot in the unlicensed band, an additional SFI for one slot may be required.

That is, in the aforementioned example, SFI information including SFIs about a maximum of 5 slots may be required.

Figure 9:
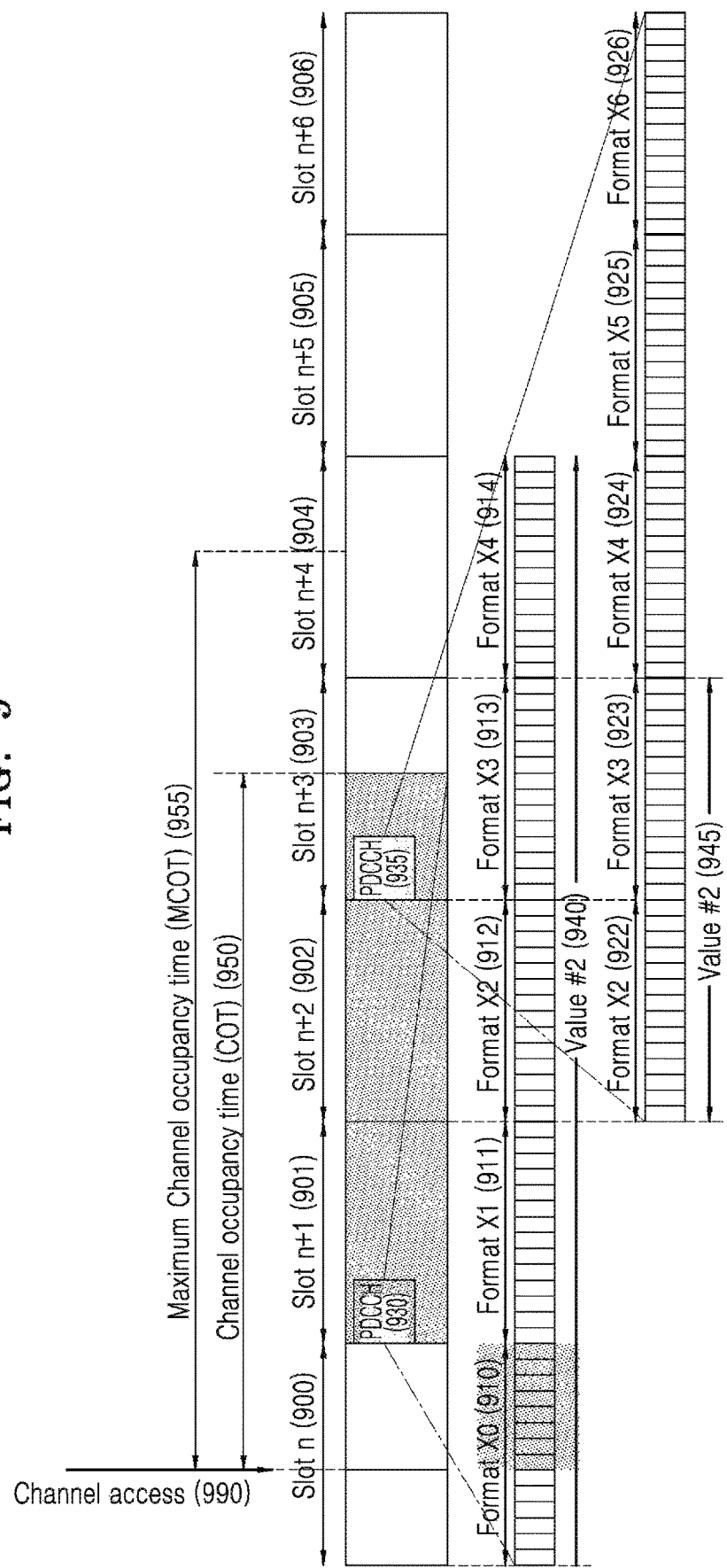
FIG. 9 is a diagram for describing valid slot information, according to an embodiment.

FIG. 9 is a diagram for describing valid slot information, according to an embodiment.

Referring to FIG. 9, in a case where a COT 950 of the BS is 4 ms, and the BS transmits a signal by 15 kHz of SCS, when the BS is able to transmit a DL signal on a symbol after a first symbol in a slot n 900 in the unlicensed band, SFI information is required, the SFI information including SFIs about 5 slots from the slot n 900 to a slot n+4 904. In other words, the number of slots (N) that are indicative by SFIs included in SFI information may be configured to be greater than (by at least one slot) the number of slots included in an MCOT. This may be determined by using Equation (6) or Equation (7), below.

$$N=N\_slot\ per\ MCOT\_p\_u+1\ or\ N=\max(N\_slot\ per\ MCOT\_p\_u+1),\ p=1,2,3,\ and\ 4 \quad (6)$$

N_slot per MCOT_p_u indicates the number of slots included in an MCOT with respect to subcarrier spacing u and priority class p. When a signal to be transmitted and received corresponds to at least one of a case where the signal includes a plurality of priority classes or a case where the signal may dynamically select and use a priority class, N_slot per MCOT_p_u may be a largest number from among a number of slots included in the MCOT with respect to the plurality of priority classes, or may be the number of slots included in the MCOT with respect to a highest priority class p (or p with a lowest priority class p). In other words, N_slot per MCOT_p indicates the number of slots included in MCOT_4 with respect to a priority class 4, which may be the highest or lowest priority class from among priority classes 1, 2, 3, and 4.

$$N=(MCOT\_p/ms)*N\_slot\ per\ subframe\_u+1\ or\ N=\max(MCOT\_p/ms)*N\_slot\ per\ subframe\_u+1,\ p=1,2,3,\ and\ 4 \quad (7)$$

N_slot per subframe u indicates the number of slots included in a subframe 1 ms with respect to subcarrier spacing u, and MCOT_p indicates an MCOT with respect to a priority class p. When a signal to be transmitted and received corresponds to at least one of a case where the signal includes a plurality of priority classes or a case where the signal may dynamically select and use a priority class, MCOT_p may be a largest MCOT with respect to the plurality of classes p, or may be an MCOT with respect to a highest priority class p (or p with a lowest priority class p). In other words, MCOT_p indicates MCOT_4 with respect to a priority class 4, which may be the highest or lowest priority class from among priority classes 1, 2, 3, and 4.

In this regard, an MCOT may be a value defined according to unlicensed band frequencies or regional limitations, or may be a value pre-defined between the BS and the UE, and a value of the MCOT may be defined differently according to priority classes used in a channel access procedure performed by the BS or the UE to transmit a signal via the unlicensed band.

Because the BS or the UE can arbitrarily change a COT of the unlicensed band within an MCOT, the BS or the UE may determine, by using the MCOT, the number of slots for which slot formats are indicated by SFI information. The UE may fix a size or the number of bits of the SFI information by fixing, using the MCOT, the number of slots for which slot formats are indicated by the SFI information, and by doing so, a size of the SFI information is not changed according to a channel access time, a priority class, or the MCOT of the BS or the UE, such that the UE may detect the SFI information having one size, and thus complexity of the UE may be minimized.

In this regard, N or N+1 determined according to Equation (6) or (7) may be the maximum number of slots whose slot formats may be indicated by SFI information, and the SFI information may include SFIs for indicating slot formats of slots, the number of the slots being less than N or N+1. In other words, at least one piece of the SFI information is configured as SFIs for indicating slot formats of N slots or N+1 slots determined according to Equation (6) or (7). For example, one piece of the SFI information is configured as SFIs for N+1 slots, and another piece of the SFI information is configured as SFIs for N slots or less.

With respect to a slot whose slot format is not indicated by the SFI information, the UE may determine that the slot is composed of only flexible symbols.

In this regard, the BS may transmit a slot format of a slot in the MCOT to the UE via a PDCCH, i.e., the BS may transmit an SFI indicating whether each symbol constituting a slot is a DL symbol, a UL symbol, or a flexible symbol. In this regard, SFI information (or SFI-DCI) that is transmitted via the PDCCH may include SFIs about a plurality of slots, and the number of SFIs to be transmitted in the SFI information may be configured based on the MCOT and SCS. When the BS transmits SFI information including SFIs about one or more slots to the UE via the PDCCH, the BS may indicate that a time or a symbol before or after the MCOT is a flexible time or a flexible symbol.

In other words, the BS cannot estimate a result of a channel access procedure performed before a time of accessing a channel for the unlicensed band, or performed at a time or a symbol after the MCOT, and thus, the BS cannot determine what to use, as the time or the symbol before or after the MCOT from among a DL symbol and a UL symbol. Therefore, when the BS transmits SFI information more than once in different time periods within a COT, the BS transmits the same SFI information, and thus may not transmit SFI information about a time or a symbol after the MCOT.

Referring to FIG. 9, the BS may perform a channel access procedure so as to transmit and receive a signal via an unlicensed band, and when the BS determines that the unlicensed band is in an idle state in a certain time or symbol of a slot n 900, the BS may access the unlicensed band and may transmit and receive a signal during a period from initiation of a channel access time 990 to an MCOT 955 or a specific COT 950 within the MCOT 955.

FIG. 9 illustrates a case in which, when the MCOT 955 is 4 ms, the BS occupies a channel during 3 ms 950 starting from the initiation of the channel access time 990, and transmits and receives a signal. The BS may transmit, to the UE via a PDCCH, SFI information about a slot within the MCOT 955 in PDCCH regions 930 and 935, the SFI information being determined or configured as previously described. In other words, SFI information including SFIs 910, 911, 912, 913, and 914 of about 5 slots (N=5) for the number of slots (N) that is calculated by using Equation (6) or (7) may be transmitted via a PDCCH 930. In this regard, a slot whose slot format is indicated by SFI information may be determined based on a PDCCH and valid slot information 940, for which an SFI is transmitted.

That is, when information about valid slots Z and SFI information are transmitted, and the UE receives them, the UE may determine that SFIs for the valid slots Z which are sequential in the SFI information are valid, and may transmit and receive a signal, based on a slot format determined to be valid. The UE may determine a slot or a symbol, which is not indicated as a valid slot by the received SFI information, as a flexible symbol or a flexible slot or as a slot or a symbol whose slot format is not indicated.

Referring to FIG. 9, the BS transmits, to the UE via the PDCCH, the SFI information including an SFI about the slot within the MCOT 955 in the PDCCH regions 930 and 935. In this regard, the SFI information transmitted within a COT of the BS is the same, and the UE may correctly determine a slot and an SFI corresponding to the slot, based on the SFI information and the valid slot information received along with the SFI information, wherein a slot format of the slot is indicated by the SFI information.

The UE may sequentially determine that SFIs about slots for the valid slots Z in the received SFI information are valid, and transmit and receive a signal according to the SFIs. Additionally, the BS may include information indicating a valid slot, and may provide the valid slot information.

SFI information may be transmitted via different PDCCH transmission regions 930 and 935 within the COT 950 or the MCOT 955 of the BS. In this regard, in a case where SFI information including SFIs about N slots (N=5 in FIG. 9) are transmitted via the PDCCH transmission region 930, and SFI information including SFIs about N slots are transmitted via the PDCCH transmission region 935, when the SFI information includes information about a symbol or a slot after the MCOT 955 of the BS, the UE may correctly determine a slot format by using the SFI information and the information about the valid slot Z received with the SFI information.

For example, when the UE receives the SFI information about the N slots 900, 901, 902, 903, and 904 via the PDCCH transmission region 930, the UE obtains a value (Z=4) of the valid slot information 940 received with the SFI information. The UE may sequentially determine that SFIs for Z slots 900, 901, 902, and 903 from among the SFIs for the N slots are valid. Similarly, when the UE receives a value (Z=2) of valid slot information 945 along with SFI information for N slots 902, 903, 904, 905, and 906 via the PDCCH transmission region 935, the UE may sequentially determine that SFIs about Z slots 902 and 903 from among the SFIs for the N slots are valid.

The BS may indicate an SFI (e.g., a format X0 910) in the SFI information transmitted via the PDCCH 930 and in the PDCCH 935 transmitted in a slot n+1 901 and a slot n+3 903, the SFI indicating that the first symbol through the sixth symbol of the slot n 900 are flexible symbols, and the seventh symbol through the fourteenth symbol of the slot n 900 are one or more UL or DL symbols.

Also, the BS may indicate an SFI (e.g., a format X3 913) indicating that the first symbol through the seventh symbol of the slot n+3 903 are one or more UL or DL symbols, and the eighth symbol through the fourteenth symbol of the slot n+3 903 are flexible symbols. Also, the BS may indicate SFIs (e.g., formats X4, X5, and X6) indicating that the first symbol through the fourteenth symbol of the slot n+4 904, the slot n+5 905, and the slot n+6 906 are flexible symbols. Also, the BS may indicate SFIs (e.g., formats X2 and X4) indicating that the first symbol through the fourteenth symbol of the slot n+1 901 and the slot n+2 902 are one or more UL or DL symbols. According to an embodiment, SFI information may be configured based on an MCOT, independently from a COT of the BS.

In this regard, the UE may determine that symbols or slots, that are indicated to be flexible and are sequential from the end from among slots whose slot formats are indicated based on the received SFI information, are not included in a COT of the BS. In other words, the UE may determine that the slot 904 or symbols which are sequentially indicated to be flexible from the end (slot 904) from among the slots 900, 901, 902, 903, and 904 whose slot formats are indicated based on the SFI information received via the PDCCH 930 of FIG. 9, or the slot 904 and symbols (the eighth symbol through the fourteenth symbol of the slot 903) which are sequentially indicated to be flexible from the end (slot 904), are symbols or a slot which is not included in the COT of the BS.

Figure 10:
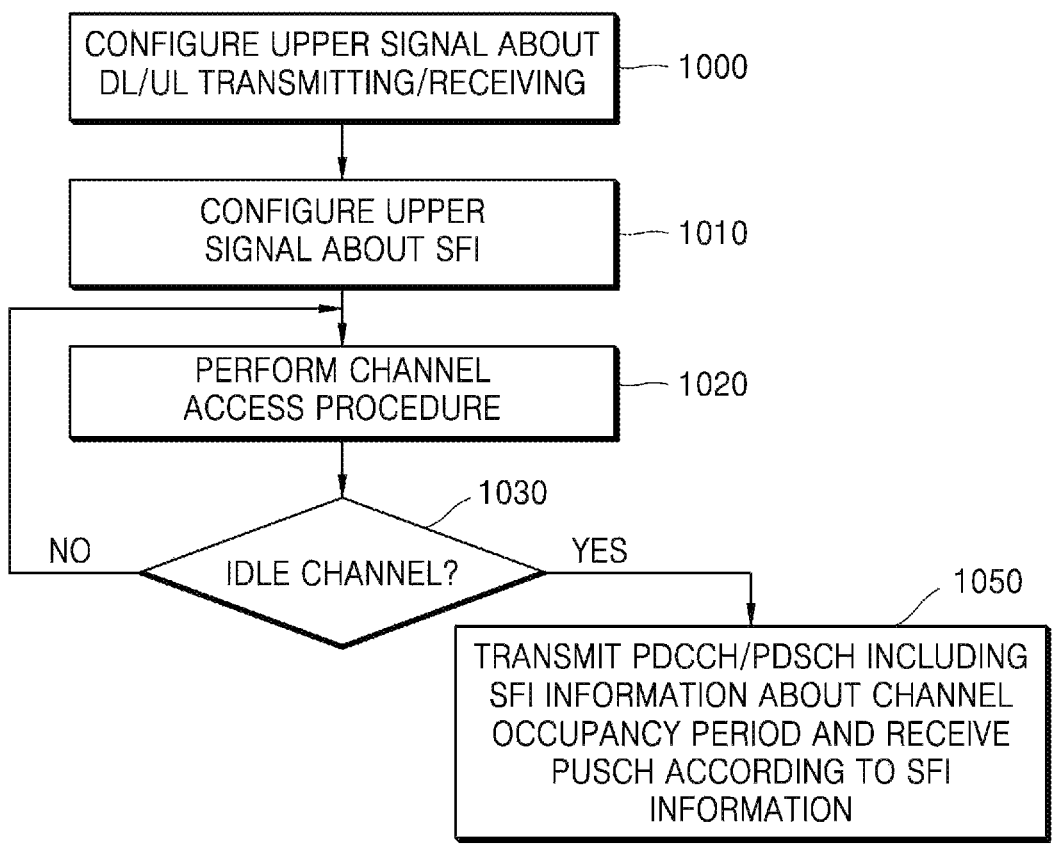
FIG. 10 is a flowchart of operations of a BS, according to an embodiment.

FIG. 10 is a flowchart for describing operations of the BS, according to an embodiment.

In step 1000, the BS transmits, to the UE by configuring an upper signal, UL and DL signal transmitting and receiving configuration information including at least one configuration for transmitting and receiving a PDCCH, a PDSCH, and a PUSCH. For example, the BS may transmit, to the UE by using the upper signal, a PDCCH resource region, CORESET configuration, or a search space configuration, for which DL or UL scheduling information is received. Also, the BS may transmit, to the UE by using the upper signal, information about a UL and DL signal transmitting and receiving configuration including information about an offset between a PDCCH reception slot and a PDSCH reception slot or a PUSCH transmission slot, PDSCH or PUSCH repetitive transmission number information, grant-free PUSCH transmission, or an SRS transmission.

In step 1010, the BS additionally transmits configuration information related to an SFI by configuring an upper signal, the configuration information including SFI information or an SFI transmission period. In this regard, the upper signal for configuring the PDCCH resource region may include a plurality of pieces of period information about a PDCCH for which, at least, SFI information is transmitted. Also, in step 1010, the BS configures a size or a bit number of the SFI information and configures an SFI that is indicative by the configured bit number. The configuration of the SFI may include SFIs or combinations of the SFIs about a plurality of slots. Also, the BS may determine and configure the size or the bit number of the SFI information, and the combinations of the SFIs, based on the number of slots included in an MCOT of the BS. Information about the configuration related to the SFI that is transmitted to the UE in step 1010, may also be transmitted in step 1000.

When the BS attempts to transmit a signal in the unlicensed band, in step 1020, the UE performs a channel access procedure on the unlicensed band. In step 1030, the UE determines whether the unlicensed band is in an idle state. When a state of the unlicensed band determined in step 1030 is not in the idle state, the BS continues or resumes the channel access procedure on the unlicensed band in step 1020. When the state of the unlicensed band determined in step 1030 is the idle state, in step 1050, the BS transmits, via the unlicensed band, DCI information for scheduling PDSCH reception or PUSCH transmission, the DCI information including COT information or SFI information corresponding thereto.

Figure 11:
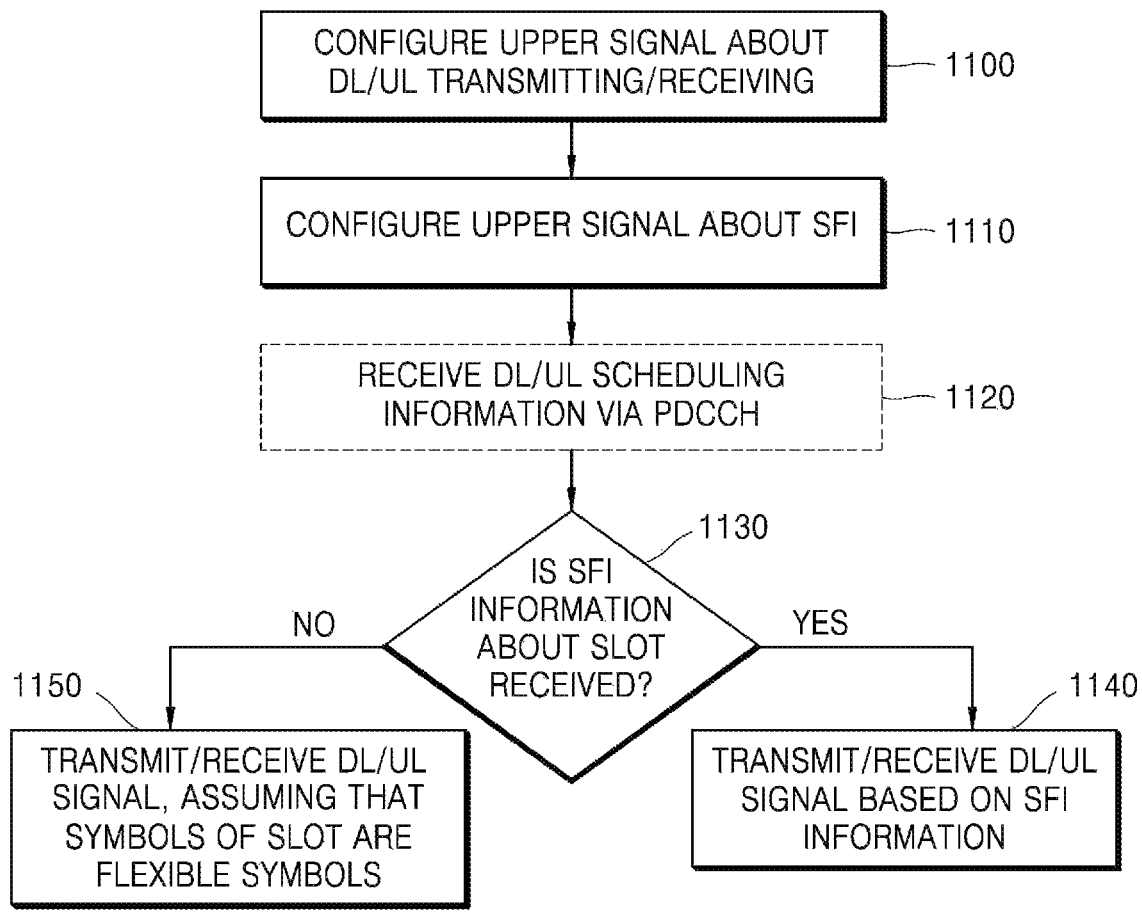
FIG. 11 is a flowchart of operations of a UE, according to an embodiment.

FIG. 11 is a diagram for describing operations of the UE, according to an embodiment.

In step 1100, the UE receives configuration information about transmitting and receiving a PDCCH, a PDSCH, and a PUSCH from the BS by configuring an upper signal, and receives UL and DL signal transmission configuration information including a configuration about transmitting and receiving the PDCCH, the PDSCH, and the PUSCH, based on the received configuration information. For example, the UE may be configured, by the upper signal from the BS, with respect to a PDCCH resource region, CORESET configuration, or search space configuration, for which DL or UL scheduling information is received. Additionally, the UE may be configured by the upper signal from the BS, with respect to a UL and DL signal transmitting and receiving configuration, including information about an offset between a PDCCH reception slot and a PDSCH reception slot or a PUSCH transmission slot, PDSCH or PUSCH repetitive transmission number information, grant-free PUSCH transmission, or SRS transmission.

In step 1110, the UE is additionally configured with respect to configuration information related to an SFI, the configuration information including SFI information or an SFI transmission period. In this regard, the configuration information related to the SFI in step 1110 is included in the configuration information of the upper signal transmitted in step 1100.

The UE is scheduled or configured by receiving DL or UL scheduling information via the unlicensed band in step 1120, with respect to PUCCH/SRS/PRACH transmission or CSI measurement including PDSCH reception scheduling or PUSCH transmission scheduling. In this regard, step 1120 may be omitted according to implementation, and when step 1120 is omitted, the UE may use upper configuration information for DL and UL signal transmitting and receiving, which is pre-configured in step 1100.

In step 1130, the UE determines whether SFI information about a slot is received.

In step 1140, the UE that has received or detected SFI information about a slot in step 1130, determines a COT of the BS and an SFI within the COT of the BS, and performs DL and UL signal transmission and reception according to the determined SFI.

When the UE did not receive nor detect the SFI information about the slot within the COT of the BS in step 1130, the UE assumes that symbols constituting the slot for which SFI information is not received nor detected are flexible, and performs DL and UL signal transmission and reception assuming that the symbols are flexible in step 1150.

In a system and node that transmits and receives a signal in a wireless communication system, the system transmits a COT and an SFI indicating a slot format in the COT. The node, having received the transmission, determines the COT and the slot format and determines a DL signal reception resource region or a UL transmission resource region by using information about the determined slot format, such that the unlicensed band may be efficiently used.

Figure 12:
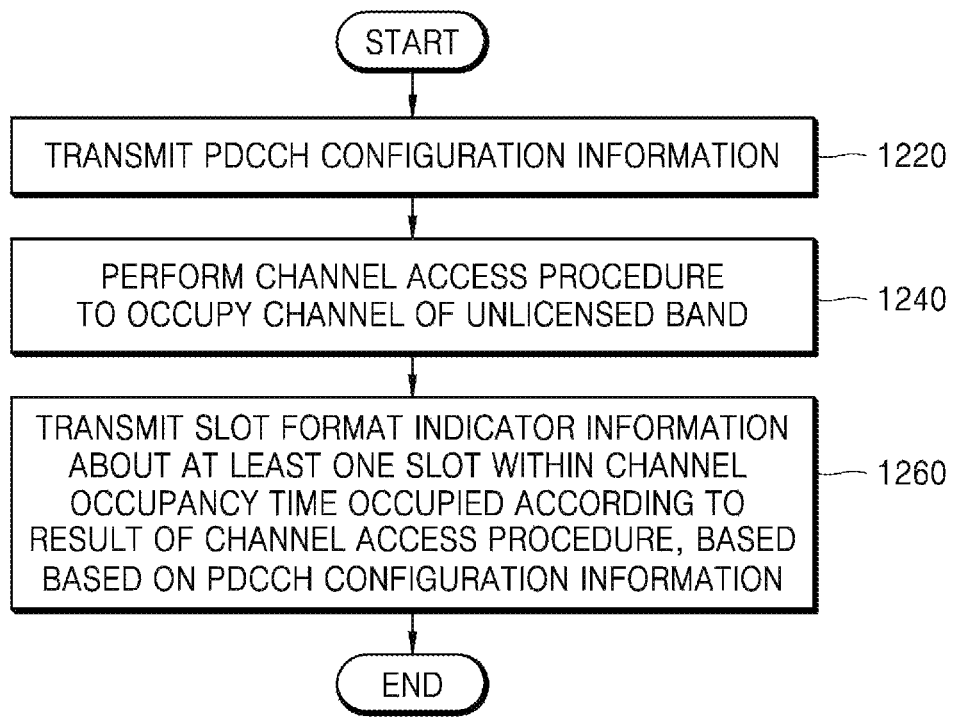
FIG. 12 is a flowchart of a method, performed by the BS, of indicating a channel occupancy time (COT), according to an embodiment.

FIG. 12 is a flowchart of a method, performed by the BS, of indicating a COT, according to an embodiment.

In step 1220, the BS transmits PDCCH configuration information.

The BS may transmit the PDCCH configuration information to the UE by using an upper signal. The upper signal may also be referred to as upper signaling, and may indicate a method of transmitting a signal from the BS to the UE by using a DL data channel of a physical layer, or from the UE to the BS by using a UL data channel of a physical layer. The upper signal may include a signal transmitted via RRC signaling, PDCP signaling, or a MAC control element, and may include system information (e.g., an SIB or a MIB).

The PDCCH configuration information may include at least one of size information about SFI information, transmission period information about the SFI information, the number of slots indicated by the SFI information, or SFI information about at least one slot indicated by the SFI information. Also, the BS may transmit at least one of the size information about SFI information or the transmission period information about the SFI information, separately from the PDCCH configuration information.

In step 1240, the BS performs a channel access procedure to occupy a channel of an unlicensed band.

The channel access procedure may include performing of an LBT operation. Also, the channel access procedure may include, but is not limited to, performing of a clear channel assessment (CCA) operation, a request to send (RTS) transmitting operation, and a clear to send (CTS) transmitting operation.

The UE may determine a type of the channel access procedure based on a target period of channel occupancy and a type of data to be transmitted.

In step 1260, the BS transmits SFI information about at least one slot within a COT occupied by performing the channel access procedure, based on the PDCCH configuration information.

The SFI information may be determined based on an MCOT of the BS and the COT occupied by performing the channel access procedure. The MCOT of the BS may refer to a maximum available time with respect to signal transmission, and may refer to the maximum available time that may be occupied by the BS without the LBT operation. The MCOT may be determined based on a priority of a signal or data to be transmitted by the BS, or may vary according to a configuration of a wireless communication system or a national policy. Also, the COT of the BS may indicate a time during which a channel is occupied for communication by the BS.

The SFI information may be transmitted in an earliest slot or an earliest symbol within the occupied COT by performing the channel access procedure. A transmission period of the SFI information within the COT may be applied to reception of an SFI, based on the earliest slot or the earliest symbol. In other words, although a transmission period of SFI information is the same both within a COT of the BS with respect to the unlicensed band and outside the COT, when the BS occupies a channel, the transmission period of the SFI information may be started again based on an earliest slot or an earliest symbol within a time of the occupied channel.

The BS may additionally transmit the SFI information in the earliest slot or the earliest symbol within the COT, occupied by performing the channel access procedure, separately from the transmission period of the SFI information. That is, the BS may continuously transmit the SFI information according to the same transmission period, and may additionally transmit an SFI by using the earliest slot or the earliest symbol within the COT.

The SFI may include information indicating a slot format of slots, the number of the slots being determined based on the MCOT of the BS. Also, the number of slots whose slot format is indicated and included in the SFI, may be determined based on spacing of carriers. When the UE receives the SFI information, the UE may determine the MCOT of the BS based on information included in the SFI information, the information indicating how many slots have their slot format indicated.

Also, the SFI may include information indicating a slot format of slots obtained by adding a predetermined number of slots to the slots, the number of the slots being determined based on the COT.

The SFI information may include information about a type or a pattern of symbols included in at least one slot determined based on the COT. When the UE receives the SFI information, the UE may determine the COT of the BS, based on a format (a structure) of a slot, a pattern of the format of the slot, a type of symbol included in the slot, and a pattern of the symbols, which are included in the SFI information. For example, based on a pattern in which at least a predetermined number of flexible symbols are sequentially arranged, the UE may determine that the flexible symbols are outside the COT of the BS.

Also, the SFI information may include information indicating a slot format of a slot before or after a predetermined interval with respect to a slot in which the SFI information is transmitted. In addition, the SFI information may include information indicating a slot format of a predetermined number of slots starting from a slot in which the SFI information is transmitted.

The BS may transmit SFI information indicating a format of a slot before a slot in which SFI information is transmitted, may transmit SFI information including information indicating a format of slots starting from a slot in which SFI information is transmitted, or may transmit an SFI including information indicating a format of slots starting from a slot in which SFI information is transmitted In addition, the BS may transmit offset information indicating a difference between a slot in which SFI information is transmitted and a first slot whose slot format is indicated by the SFI information. The offset information may be transmitted along with the PDCCH configuration information or may be separately transmitted, may be transmitted along with size information about the SFI information or transmission period information about the SFI information, or may be transmitted along with the SFI information.

The BS may transmit valid slot information indicating which slots have valid slot format information from among slots whose slot format is indicated by the SFI information.

The valid slot information may be transmitted along with the PDCCH configuration information or may be separately transmitted, may be transmitted along with the size information about the SFI information or the transmission period information about the SFI information, or may be transmitted along with the SFI information.

Figure 13:
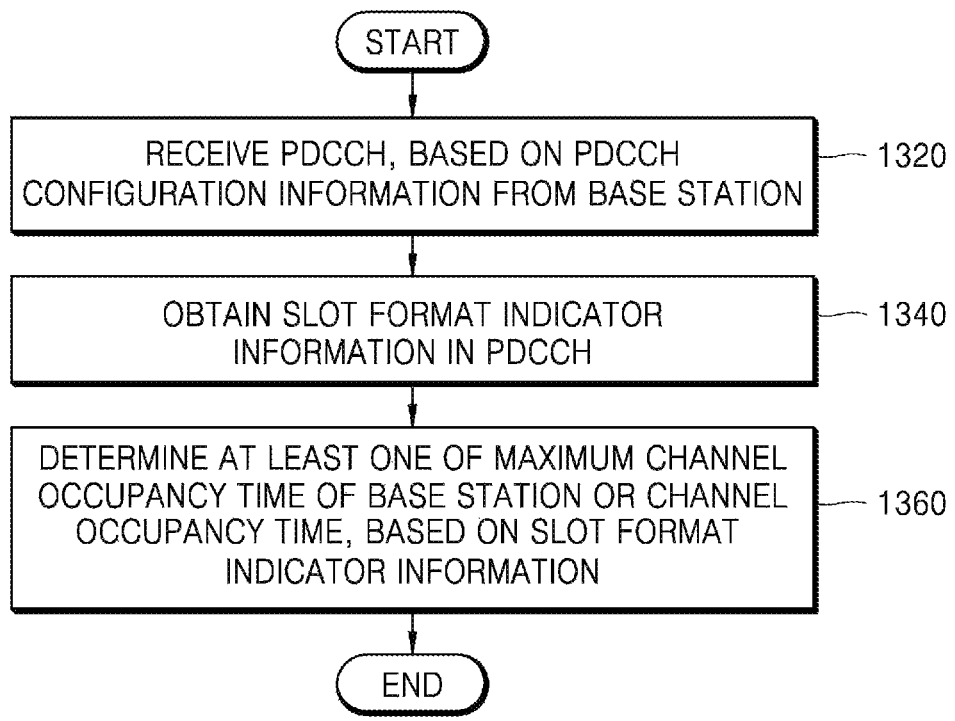
FIG. 13 is a flowchart of a method, performed by the UE, of obtaining COT information, according to an embodiment.

FIG. 13 is a flowchart of a method, performed by the UE, of obtaining COT information, according to an embodiment.

In step 1320, the UE receives a PDCCH based on PDCCH configuration information from the BS. The UE may receive the PDCCH configuration information by using an upper signal from the BS, and may receive the PDCCH based on the PDCCH configuration information.

The PDCCH configuration information may include at least one of size information about SFI information, transmission period information about the SFI information, the number of slots indicated by the SFI information, or SFI information about one or more slots indicated by the SFI information. Also, the BS may transmit at least one of the size information about SFI information or transmission or reception period information about the SFI information, separately from the PDCCH configuration information.

In step 1340, the UE obtains the SFI information in the PDCCH.

The UE may obtain DCI by detecting a PDCCH region based on the PDCCH configuration information, and may obtain the SFI information from the obtained DCI. The SFI information may be determined based on an MCOT of the BS and a COT occupied by performing a channel access procedure.

The UE may receive the SFI information from an earliest slot or an earliest symbol within the COT occupied by the BS by performing the channel access procedure. A reception period of the SFI information may be applied to reception of an SFI based on the earliest slot or the earliest symbol within the COT. The UE may have different reception periods or may have a same reception period, regardless of channel occupancy by the BS.

Even when the UE has a same reception period before and during a channel occupancy period of the BS, the BS may additionally transmit an SFI via the earliest slot or the earliest symbol within the COT occupied by performing the channel access procedure.

In step 1360, the UE determines at least one of the MCOT of the BS or the COT based on the SFI information.

The UE may determine the MCOT based on the number of slots whose slot format is indicated by the SFI information. For example, when the number of slots whose slot format is indicated by the SFI information is 5, the UE may determine that the MCOT of the BS is 4 ms.

The UE may determine the COT based on a type or a pattern of symbols included in at least one slot included in the SFI information. For example, when the obtained SFI includes information indicating that a fourth slot and a fifth slot are all flexible symbols, the UE may determine that the fourth slot and the fifth slot are outside the COT of the BS. When the obtained SFI includes information indicating that symbols of slots in a backward direction from a last slot (e.g., a fourth slot starting from a fifth slot) are all flexible symbols (e.g., symbols of the fourth slot and the fifth slot are all flexible symbols), the UE may determine that the fourth slot and the fifth slot are outside the COT of the BS.

When the UE fails to receive SFI information about a certain slot, the UE may determine that symbols included in the certain slot are all flexible symbols.

The UE may determine whether to perform at least one of UL transmission or a channel access procedure based on a result of determining the MCOT of the BS and the COT.

For example, the UE may determine whether to transmit, to the BS, at least one UL signal from among UL control information (e.g., UCI or a PUCCH), an SRS, a PRACH, and a PUSCH, based on the MCOT of the BS and the COT. Also, the UE may determine whether to perform a channel access procedure based on the determined MCOT of the BS and the determined COT.

The UE may determine a type of the channel access procedure based on the determined MCOT of the BS and the determined COT.

In addition, the UE may additionally receive the offset information described above. Also, the UE may additionally receive the valid slot information FIG. 14 is a block diagram illustrating an internal structure of the BS, according to an embodiment.

Figure 14:
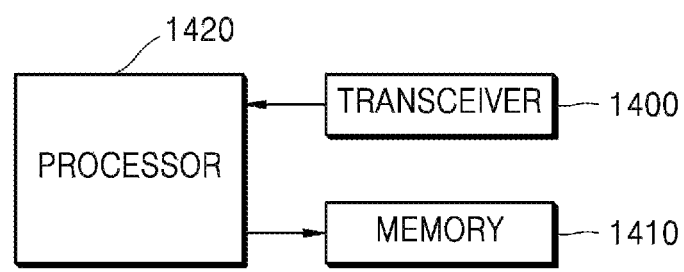
FIG. 14 is a block diagram illustrating a structure of the BS, according to an embodiment.

As illustrated in FIG. 14, the BS of the disclosure includes a transceiver 1400, a memory 1410, and a processor 1420. The BS may be embodied with more elements than the aforementioned elements or may be embodied with fewer elements than the aforementioned elements. Also, the processor 1420, the transceiver 1400, and the memory 1410 may be implemented as one chip. Multiple processors may also be provided.

A receiver and a transmitter of the BS may be collectively called the transceiver 1400, and the transceiver 1400 may transmit and receive a signal to/from the UE. The signal transmitted to or received from the UE may include control information and data. The transceiver 1400 may include a radio frequency (RF) transmitter configured to up-convert and amplify a frequency of a signal to be transmitted, and an RF receiver configured to low-noise amplify a received signal and down-convert a frequency. Also, the transceiver 1400 may receive a signal via a wireless channel, may output the signal to the processor 1420, and may transmit, via the wireless channel, a signal output from the processor 1420.

The processor 1420 may control a series of processes to make the BS operate. For example, the transceiver 1400 may receive a data signal including a control signal transmitted from the UE, and the processor 1420 may determine a reception result with respect to the control signal and the data signal transmitted from the UE.

The processor 1420 may perform a channel access procedure on an unlicensed band. For example, the transceiver 1400 may receive a signal transmitted via the unlicensed band, and the processor 1420 may determine whether the unlicensed band is in an idle state by comparing a strength of the received signal with a threshold value that is predefined or is determined as a result value of a function using a bandwidth as a factor.

The processor 1420 may maintain or change a value of a contention period for the channel access procedure based on a received data signal reception result of the UE. When it is determined that the unlicensed band is in the idle state, the processor 1420 may control the transceiver 1400 to transmit a DL signal including SFI information. In this regard, the transceiver 1400 may transmit, to the UE, the DL signal including information about a UL or DL transmission period within a COT of the unlicensed band, the COT being determined by the processor 1420.

The transceiver 1400 of the BS may receive a PUSCH, which is transmitted by the UE, in a PUSCH transmission resource region determined based on the SFI information and PDSCH/PUSCH scheduling information.

The processor 1420 may perform a series of operations for providing the UE with a configuration of slot format information (e.g., the SFI information), providing the slot format information, and providing a plurality of pieces of additional information such as offset information and valid slot information. That is, the processor 1420 may control other elements of the BS to perform transmission of an upper signal, transmission of an SFI, transmission of DCI, or the channel access procedure.

The processor 1420 may perform a series of operations for providing information about a time to provide the SFI, information indicating how many SFIs are to be provided, information indicating from which slot format information is to be provided, and additional information for providing the same SFI information to the same slot.

The processor 1420 may control the transceiver 1400 and the memory 1410 to transmit PDCCH configuration information to the UE by executing a program stored in the memory 1410 so as to indicate a COT, to perform a channel access procedure to occupy a channel in the unlicensed band, and to provide SFI information about at least one slot within a COT occupied by performing the channel access procedure. Also, the processor 1420 may control other elements of the BS to perform the aforementioned method of indicating a COT.

The memory 1410 may store a program and data necessary for operations of the BS. Also, the memory 1410 may store a control signal or data included in a signal obtained by the BS. The memory 1410 may be implemented as a storage medium including a read-only memory (ROM), a random access memory (RAM), a hard disk, a compact disc-ROM (CD-ROM), or a digital versatile disc (DVD), or any combination thereof.

Figure 15:
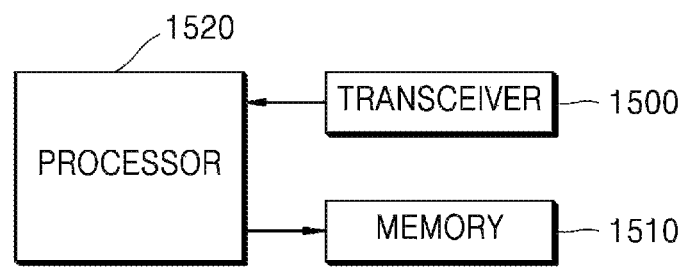
FIG. 15 is a block diagram illustrating a structure of the UE, according to an embodiment.

FIG. 15 is a block diagram illustrating an internal structure of the UE, according to an embodiment of the disclosure.

As illustrated in FIG. 15, the UE includes a transceiver 1500, a memory 1510, and a processor 1520. The UE may be embodied with more elements than the aforementioned elements or may be embodied with fewer elements than the elements. Also, the processor 1520, the transceiver 1500, and the memory 1510 may be implemented as one chip. Multiple processors may also be provided.

A receiver and a transmitter of the UE may be collectively called the transceiver 1500, and the transceiver 1500 may transmit and receive a signal to/from the BS. The signal transmitted to or received from the BS may include control information and data. The transceiver 1500 may include an RF transmitter configured to up-convert and amplify a frequency of a signal to be transmitted, and an RF receiver configured to low-noise amplify a received signal and down-convert a frequency.

The transceiver 1500 may receive a signal via a wireless channel, may output the signal to the processor 1520, and may transmit, via the wireless channel, a signal output from the processor 1520. The processor 1520 may control a series of processes to make the UE operate according to the embodiments of the disclosure. For example, the transceiver 1500 may receive a data signal including a control signal, and the processor 1520 may determine a reception result with respect to the data signal. Afterward, in a case where the UE is required to transmit, to the BS, a first signal reception result including reception of data at a particular timing, the transceiver 1500 transmits the first signal reception result to the BS at the timing determined by the processor 1520.

When the transceiver 1500 receives, from the BS, information about a UL or DL transmission period in a channel occupancy period of the unlicensed band, the processor 1520 may re-configure or change a DL control channel transmission time or period of the UE, or the UE may re-configure or change time domain assignment information of a scheduled UL data channel, such that the transceiver 1500 of the UE may receive a DL control channel transmitted by the BS.

The transceiver 1500 of the UE may receive, from the BS, a reception result with respect to UL data transmitted by the transceiver 1500, and the processor 1520 may maintain or change a size of a contention period used in a channel access procedure for signal transmission in an unlicensed band based on the received reception result.

The transceiver 1500 of the UE may receive SFI information transmitted by the BS, and the processor 1520 may re-configure or change time domain assignment information of a scheduled UL data channel based on the received SFI information.

The processor 1520 may perform a series of operations for receiving, from the BS, a configuration of slot format information, e.g., the SFI information, the slot format information, and a plurality of pieces of additional information such as offset information and valid slot information. Additionally, the processor 1520 may obtain the slot format information based on the received information. That is, the processor 1520 may control other elements of the UE to perform reception of an upper signal, reception of an SFI, reception of DCI, or the channel access procedure.

Also, the processor 1520 may perform a series of operations for obtaining information about a time to provide the SFI, information indicating how many SFIs are to be provided, information indicating from which slot format information is to be provided, and additional information for providing the same SFI information to the same slot. In addition, the processor 1520 may determine a slot format of each slot based on the obtained information, and perform communication according to the determined slot format.

The processor 1520 may control the transceiver 1500 and the memory 1510 to receive a PDCCH from the BS based on PDCCH configuration information by executing a program stored in the memory 1510 so as to obtain COT information, to obtain SFI information in the received PDCCH, and to determine at least one of a MCOT of the BS or a COT, based on the SFI information. In addition, the processor 1520 may control other elements of the UE to perform the aforementioned method of obtaining the COT information.

The memory 1510 may store the program and data necessary for operations of the UE. Also, the memory 1510 may store a control signal or data included in a signal obtained by the UE. The memory 1510 may be implemented as a storage medium including a ROM, a RAM, a hard disk, a CD-ROM, or a DVD, or any combination thereof.

The methods according to the embodiments of the disclosure described in the claims or in the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory system including a combination of some or all of the above-mentioned memory devices. In addition, a plurality of each memory device may be provided.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

Accordingly, a service may be efficiently provided in a wireless communication system.

In the aforementioned description, elements are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

The embodiments of the disclosure described with reference to the present specification and drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined with each other as required. For example, portions of the methods provided by the disclosure may be combined with each other to enable the BS and the UE to operate. Also, although the embodiments of the disclosure are described based on 5G and NR systems, modifications based on the technical scope of the embodiments of the disclosure may be applied to other similar communication systems, such as LTE, LTE-A, or LTE-A-Pro systems.

Thus, while the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method, performed by a user equipment (UE), of obtaining channel occupancy time information, the method comprising:
    detecting downlink control information (DCI), based on physical downlink control channel (PDCCH) configuration information;
    obtaining slot format indicator (SFI) information included in the DCI; and
    identifying a channel occupancy time of a base station (BS), based on the SFI information,
    wherein the SFI information indicates a slot format of at least one slot starting from a slot in which the DCI including the SFI information is detected.

2. The method of 1, wherein a number of the at least one slot for which the slot format is indicated by the SFI information is determined based on the channel occupancy time.

3. The method of claim 1, wherein the SFI information further comprises information about types or a pattern of symbols comprised in at least one slot determined based on the channel occupancy time.

4. The method of claim 1, wherein the PDCCH configuration information includes at least one of offset information or period information for monitoring the DCI.

5. A method, performed by a base station (BS), of indicating a channel occupancy time, the method comprising:
    transmitting physical downlink control channel (PDCCH) configuration information to a user equipment (UE);
    performing a channel access procedure to occupy a channel; and
    transmitting, within the channel occupancy time, downlink control information (DCI) including slot format indicator (SFI) information about at least one slot based on the PDCCH configuration information, the channel occupancy time being occupied by performing the channel access procedure,
    wherein the SFI information is used to indicate the channel occupancy time to the UE, the SFI information indicates a slot format of at least one slot starting from a slot in which the DCI including the SFI information is detected.

6. The method of claim 5, wherein a number of the at least one slot for which the slot format is indicated by the SFI information is determined based on the channel occupancy time.

7. The method of claim 5, wherein the SFI information further comprises information about types or a pattern of symbols comprised in at least one slot determined based on the channel occupancy time.

8. The method of claim 5, wherein the PDCCH configuration information includes at least one of offset information or period information for monitoring the DCI.

9. A user equipment (UE) for obtaining channel occupancy time information, the UE comprising:

a transceiver; and a processor coupled with the transceiver and configured to:

detect downlink control information (DCI), based on physical downlink control channel (PDCCH) configuration information, obtain slot format indicator (SFI) information included in the DCI, and identify a channel occupancy time of a base station (BS), based on the SFI information, wherein the SFI information indicates a slot format of at least one slot starting from a slot in which the DCI including the SFI information is detected.

10. The UE of claim 9, wherein a number of the at least one slot for which the slot format is indicated by the SFI information is determined based on the channel occupancy time.

11. The UE of claim 9, wherein the SFI information further comprises information about types or a pattern of symbols comprised in at least one slot determined based on the channel occupancy time.

12. The UE of claim 9, wherein the PDCCH configuration information includes at least one of offset information or period information for monitoring the DCI.

13. A base station (BS) for indicating a channel occupancy time, the BS comprising:

a transceiver; and a processor coupled with the transceiver and configured to:

transmit physical downlink control channel (PDCCH) configuration information to a user equipment (UE), perform a channel access procedure to occupy a channel; and transmit, within the channel occupancy time, downlink control information (DCI) including slot format indicator (SFI) information about at least one slot based on the PDCCH configuration information, the channel occupancy time being occupied by performing the channel access procedure, wherein the SFI information is used to indicate the channel occupancy time to the UE, the SFI information indicates a slot format of at least one slot starting from a slot in which the DCI including the SFI information is detected.

14. The BS of claim 13, wherein a number of the at least one slot for which the slot format is indicated by the SFI information is determined based on the channel occupancy time.

15. The BS of claim 13, wherein the SFI information further comprises information about types or a pattern of symbols comprised in at least one slot determined based on the channel occupancy time.

16. The BS of claim 13, wherein the PDCCH configuration information includes at least one of offset information or period information for monitoring the DCI.

* * * * *